US009137755B2

(12) United States Patent
Malladi et al.

(10) Patent No.: US 9,137,755 B2
(45) Date of Patent: Sep. 15, 2015

(54) PREAMBLE BASED UPLINK POWER CONTROL FOR LTE

(71) Applicant: QUALCOMM Incorporated, San Diego, CA (US)

(72) Inventors: Durga Prasad Malladi, San Diego, CA (US); Juan Montojo, Nuremberg (DE)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/026,500

(22) Filed: Sep. 13, 2013

(65) Prior Publication Data
US 2014/0038660 A1 Feb. 6, 2014

Related U.S. Application Data

(60) Continuation of application No. 13/117,980, filed on May 27, 2011, now Pat. No. 8,559,889, which is a division of application No. 12/030,333, filed on Feb. 13, 2008, now Pat. No. 7,986,959.

(60) Provisional application No. 60/889,931, filed on Feb. 14, 2007.

(51) Int. Cl.
H04B 1/00 (2006.01)
H04W 52/10 (2009.01)
(Continued)

(52) U.S. Cl.
CPC .............. H04W 52/10 (2013.01); H04W 52/08 (2013.01); H04W 52/44 (2013.01)

(58) Field of Classification Search
USPC ................... 455/69, 522, 456.2, 134
See application file for complete search history.

(56) References Cited

U.S. PATENT DOCUMENTS 6,757,319 B1  6/2004 Parsa et al.
6,859,445 B1  2/2005 Moon et al.
(Continued)

FOREIGN PATENT DOCUMENTS

CN  1363144 A  8/2002
EP  1628413    2/2006
(Continued)

OTHER PUBLICATIONS

3rd Generation Partnership Project; Technical Specification Group Radio Access Network; Physical Channels and Modulation (Release 8),3GPP TS 36.211 V0.3.1,3GPP,Feb. 6, 2007,p. 1-p. 27.
(Continued)

Primary Examiner — Tu X Nguyen
(74) Attorney, Agent, or Firm — Anthony R. Morris

(57) ABSTRACT

Systems and methodologies are described that facilitate utilizing power control preambles with closed loop power control techniques in a wireless communication environment. An uplink grant can be transferred over a downlink (e.g., a first uplink grant after uplink inactivity), and a power control preamble can be sent over an uplink in response to the uplink grant. According to an example, transmission of the power control preamble can be explicitly scheduled and/or implicitly scheduled. The power control preamble can be transmitted at a power level determined by an access terminal utilizing an open loop power control mechanism. A base station can analyze the power control preamble and generate a power control command based thereupon to correct the power level employed by the access terminal. The access terminal can thereafter utilize the power control command to adjust the power level for uplink data transmission.

20 Claims, 17 Drawing Sheets

(51) Int. Cl.
*H04W 52/08* (2009.01)
*H04W 52/44* (2009.01)

(56) References Cited

U.S. PATENT DOCUMENTS

| | | |
|---|---|---|
| 7,020,483 B2 | 3/2006 | Oestreich |
| 7,177,596 B2 | 2/2007 | Chen et al. |
| 7,352,722 B2 | 4/2008 | Malladi et al. |
| 7,738,902 B2 | 6/2010 | Murata et al. |
| 7,986,959 B2 | 7/2011 | Malladi et al. |
| 8,437,792 B2 | 5/2013 | Malladi et al. |
| 2001/0046220 A1 | 11/2001 | Koo et al. |
| 2003/0050084 A1 | 3/2003 | Damnjanovic et al. |
| 2005/0202818 A1 | 9/2005 | Hondo et al. |
| 2005/0239467 A1 | 10/2005 | Nishio |
| 2007/0030829 A1 | 2/2007 | Vimpari et al. |
| 2007/0147310 A1 | 6/2007 | Cai |
| 2008/0069075 A1 | 3/2008 | Holl et al. |
| 2008/0247375 A1 | 10/2008 | Muharemovic et al. |
| 2008/0316950 A1 | 12/2008 | Damnjanovic |
| 2009/0239590 A1 | 9/2009 | Parkvall |
| 2010/0238892 A1 | 9/2010 | Dahlman et al. |
| 2010/0246561 A1 | 9/2010 | Shin et al. |
| 2011/0002290 A1 | 1/2011 | Kim et al. |
| 2011/0080889 A1* | 4/2011 | Kanterakis .................. 370/329 |
| 2011/0081935 A1 | 4/2011 | Yeon et al. |
| 2011/0141941 A1 | 6/2011 | Lee et al. |
| 2011/0294530 A1 | 12/2011 | Malladi et al. |

FOREIGN PATENT DOCUMENTS

| | | |
|---|---|---|
| EP | 1873935 A1 | 1/2008 |
| GB | 2384650 | 7/2003 |
| JP | 2005260851 A | 9/2005 |
| RU | 2221331 C2 | 1/2004 |
| RU | 2249915 C2 | 4/2005 |
| RU | 2005127632 A | 1/2006 |
| TW | 200306712 | 11/2003 |
| WO | 0152440 | 7/2001 |
| WO | 0161878 A1 | 8/2001 |
| WO | 2004070957 A2 | 8/2004 |
| WO | 2006104208 A1 | 10/2006 |

OTHER PUBLICATIONS

International Search Report—PCT/US08/053922—International Search Authority, European Patent Office—Oct. 16, 2008.
NTT, "Downlink L1/L2 Control Signaling Channel Structure: Coding",3GPP TSG RAN WG Meeting #47bis R1-070103,3GPP,Jan. 2007,p. 1-p. 17.
Qualcomm,"Overview of Uplink Intra and Inter Cell Power Control",3GPP TSG RAN1 #47-bis R1-070441,3GPP, Jan. 2007,p. 1-p. 3.
Siemens AG.: "Improvements to uplink closed-loop power control for 1.28Mcps TDD", 3GPP TSG-RAN WG Meeting #46, R2-050315, Feb. 1, 2005 8 sections 8.6.6.11, 10.3.6.65, 10.3.6.91.
Taiwan Search Report—TW097105205—TIPO—Jul. 19, 2011.
Written Opinion—PCT/US08/053922—International Search Authority, European Patent Office—Oct. 16, 2008.

* cited by examiner

PREAMBLE BASED UPLINK POWER CONTROL FOR LTE

CROSS-REFERENCE TO RELATED APPLICATIONS

This application is a continuation of U.S. patent application Ser. No. 13/117,980, entitled PREAMBLE BASED UPLINK POWER CONTROL FOR LTE, filed May 27, 2011, now allowed, which is a divisional of U.S. patent application Ser. No. 12/030,333, entitled PREAMBLE BASED UPLINK POWER CONTROL FOR LTE, filed Feb. 13, 2008, which issued as U.S. Pat. No. 7,986,959 and which claims the benefit of U.S. Provisional Patent Application Ser. No. 60/889,931, entitled A METHOD AND APPARATUS FOR POWER CONTROL USING A POWER CONTROL PREAMBLE, filed Feb. 14, 2007, all of which are incorporated by reference in their entirety.

FIELD

The following description relates generally to wireless communications, and more particularly to controlling uplink (UL) power levels employed by access terminals in a Long Term Evolution (LTE) based wireless communication system.

BACKGROUND

Wireless communication systems are widely deployed to provide various types of communication; for instance, voice and/or data can be provided via such wireless communication systems. A typical wireless communication system, or network, can provide multiple users access to one or more shared resources (e.g., bandwidth, transmit power, etc.). For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), Single Carrier Frequency Division Multiplexing (SC-FDM), and others. Additionally, the system can conform to specifications such as third generation partnership project (3GPP), 3GPP long term evolution (LTE), etc.

Generally, wireless multiple-access communication systems can simultaneously support communication for multiple access terminals. Each access terminal can communicate with one or more base stations via transmissions on forward and reverse links. The forward link (or downlink) refers to the communication link from base stations to access terminals, and the reverse link (or uplink) refers to the communication link from access terminals to base stations. This communication link can be established via a single-input-single-output (SISO), multiple-input-single-output (MISO), single-input-multiple-output (SIMO) or a multiple-input-multiple-output (MIMO) system.

Wireless communication systems oftentimes employ one or more base stations and sectors therein that provide a coverage area. A typical sector can transmit multiple data streams for broadcast, multicast and/or unicast services, wherein a data stream may be a stream of data that can be of independent reception interest to an access terminal. An access terminal within the coverage area of such sector can be employed to receive one, more than one, or all the data streams carried by the composite stream. Likewise, an access terminal can transmit data to the base station or another access terminal. With many access terminals transmitting signal data in proximity, power control is important for yielding sufficient signal to noise ratios (SNRs) at different data rates and transmission bandwidths for communications over the uplink. It is desirable to keep the overhead incurred from the transmission of the power adjustments to these access terminals as low as possible while achieving the aforementioned goals. The reduction in the overhead in support of power control adjustments make it difficult to guarantee an adequate reception reliability level in all situations, and most notably in situations with extended periods of data inactivity in the UL.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating utilization of power control preambles with aperiodic closed loop power control techniques in a wireless communication environment. An uplink grant can be transferred over a downlink (e.g., a first uplink grant after uplink inactivity), and a power control preamble can be sent over an uplink in response to the uplink grant. According to an example, transmission of the power control preamble can be explicitly scheduled and/or implicitly scheduled. The power control preamble can be transmitted at a power level determined by an access terminal utilizing an open loop power control mechanism. A base station can analyze the power control preamble and generate a power control command based thereupon to correct the power level employed by the access terminal. The access terminal can thereafter utilize the power control command to adjust the power level for uplink data transmission.

According to related aspects, a method that facilitates generating a power control preamble for utilization in a wireless communication environment is described herein. The method can include receiving an uplink grant from a base station, the uplink grant being a first uplink grant after uplink inactivity. Further, the method can comprise transmitting a power control preamble to the base station with a power setting based on open loop power control. Moreover, the method can include receiving a power control command from the base station, the power control command adjusts the power setting. The method can also include transmitting data to the base station with the adjusted power setting.

Another aspect relates to a wireless communications apparatus. The wireless communications apparatus can include a memory that retains instructions related to obtaining an uplink grant from a base station, the uplink grant being a first uplink grant after uplink inactivity, determining a power level for power control preamble transmission based upon an open loop evaluation, sending a power control preamble to the base station at the power level, receiving a power control command from the base station, altering the power level based upon the power control command, and sending an uplink data transmission to the base station at a power level that has been altered in accordance to the power control command. Further, the wireless communications apparatus can include a processor, coupled to the memory, configured to execute the instructions retained in the memory.

Yet another aspect relates to a wireless communications apparatus that enables utilizing power control preambles in a wireless communication environment. The wireless communications apparatus can include means for obtaining an uplink grant, the uplink grant being a first uplink subsequent to uplink inactivity. Further, the wireless communications apparatus can include means for transferring an uplink power control preamble at a power level selected as a function of an open loop power control estimate. Moreover, the wireless communications apparatus can comprise means for obtaining a power control command that alters the power level. Additionally, the wireless communications apparatus can include means for transmitting uplink data at the altered power level.

Still another aspect relates to a machine-readable medium having stored thereon machine-executable instructions for obtaining an uplink grant, the uplink grant being a first uplink grant after uplink inactivity; transferring an uplink power control preamble at a power level selected as a function of an open loop power control estimate; obtaining a power control command that alters the power level; and transmitting uplink data at the altered power level.

In accordance with another aspect, an apparatus in a wireless communication system can include a processor, wherein the processor can be configured to obtain an uplink grant from a base station, the uplink grant being a first uplink grant subsequent to uplink inactivity. Further, the processor can be configured to determine a power level for power control preamble transmission based upon an open loop evaluation. The processor can also be configured to send a power control preamble to the base station at the power level. Moreover, the processor can be configured to receive a power control command from the base station. Additionally, the processor can be configured to alter the power level based upon the power control command. Further, the processor can be configured to send an uplink data transmission to the base station at the altered power level.

According to other aspects, a method that facilitates evaluating power control preambles for employment with power control in a wireless communication environment is described herein. The method can include transmitting an uplink grant to an access terminal. Further, the method can include receiving a power control preamble sent from the access terminal at a power level set based upon open loop power control. Moreover, the method can comprise generating a power control command based upon an analysis of the power control preamble, the power control command corrects the power level of the access terminal. The method can also include transmitting the power control command to the access terminal. Additionally, the method can include receiving an uplink data transmission sent from the access terminal at the corrected power level.

Yet another aspect relates to a wireless communications apparatus that can include a memory that retains instructions related to transferring an uplink grant, obtaining a power control preamble sent via an uplink at a power level determined by an open loop power control mechanism, yielding a power control command that corrects the power level based upon an evaluation of the power control preamble, sending the power control command via a downlink, and obtaining an uplink data transmission sent at the corrected power level. Further, the wireless communications apparatus can comprise a processor, coupled to the memory, configured to execute the instructions retained in the memory.

Another aspect relates to a wireless communications apparatus that enables yielding power control commands based upon power control preambles for utilization by access terminals in wireless communication environment. The wireless communications apparatus can include means for sending an uplink grant over a downlink. Moreover, the wireless communications apparatus can include means for obtaining a power control preamble sent at a power level determined from an open loop estimate. The wireless communications apparatus can additionally comprise means for sending a power control command that corrects the power level. Further, the wireless communications apparatus can include means for obtaining an uplink data transmission at the corrected power level.

Still another aspect relates to a machine-readable medium having stored thereon machine-executable instructions for sending an uplink grant over a downlink; obtaining a power control preamble sent at a power level determined from an open loop estimate; sending a power control command that corrects the power level; and obtaining an uplink data transmission at the corrected power level.

In accordance with another aspect, an apparatus in a wireless communication system can include a processor, wherein the processor can be configured to transmit an uplink grant to an access terminal. The processor can also be configured to receive a power control preamble sent from the access terminal at a power level set based upon open loop power control. Further, the processor can be configured to generate a power control command based upon an analysis of the power control preamble, the power control command corrects the power level of the access terminal. Moreover, the processor can be configured to transmit the power control command to the access terminal. Additionally, the processor can be configured to receive an uplink data transmission sent from the access terminal at the corrected power level.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
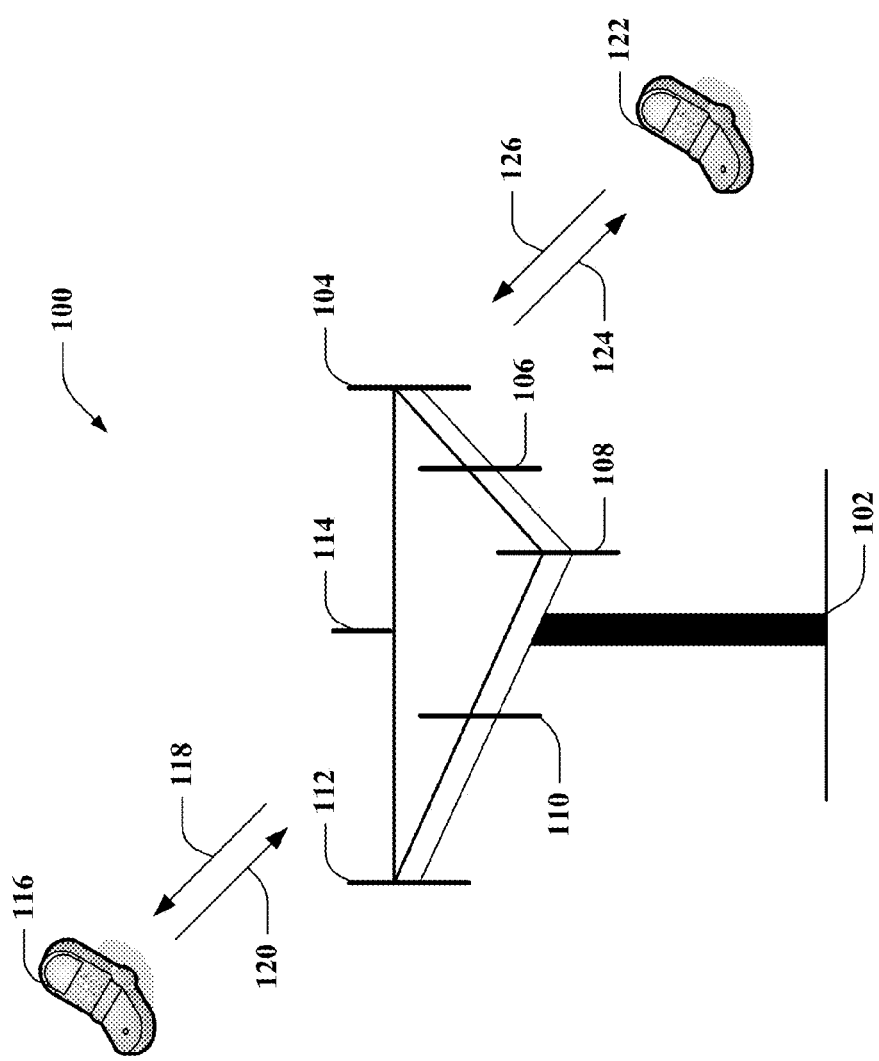
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with an access terminal. An access terminal can also be called a system, subscriber unit, subscriber station, mobile station, mobile, remote station, remote terminal, mobile device, user terminal, terminal, wireless communication device, user agent, user device, or user equipment (UE). An access terminal can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with access terminal(s) and can also be referred to as an access point, Node B, eNode B (eNB), or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

The corresponding sector of base station 102 can communicate with one or more access terminals such as access terminal 116 and access terminal 122; however, it is to be appreciated that base station 102 can communicate with substantially any number of access terminals similar to access terminals 116 and 122. Access terminals 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, access terminal 116 is in communication with antennas 112 and 114, where antennas 112 and 114 transmit information to access terminal 116 over a forward link 118 and receive information from access terminal 116 over a reverse link 120. Moreover, access terminal 122 is in communication with antennas 104 and 106, where antennas 104 and 106 transmit information to access terminal 122 over a forward link 124 and receive information from access terminal 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102, or as a cell of an eNB. For example, antenna groups can be designed to communicate to access terminals in a sector of the areas covered by base station 102. In communication over forward links 118 and 124, the transmitting antennas of base station 102 can utilize beamforming to improve signal-to-noise ratio of forward links 118 and 124 for access terminals 116 and 122. Also, while base station 102 utilizes beamforming to transmit to access terminals 116 and 122 scattered randomly through an associated coverage, access terminals in neighboring cells can be subject to less interference as compared to a base station transmitting through a single antenna to all its access terminals.

System 100 can be a Long Term Evolution (LTE) based system, for instance. In such system 100, the corresponding sectors of base station 102 can control uplink power levels utilized by access terminals 116 and 122. Hence, system 100 can provide uplink (UL) power control which yields compensation of path loss and shadowing (e.g., path loss and shadowing can slowly change over time) and compensation of time-varying interference from adjacent cells (e.g., since system 100 can be an LTE based system that utilizes frequency reuse 1). Moreover, system 100 can mitigate large variations of receive power obtained at base station 102 across users (e.g., since the users can be multiplexed within a common band). Further, system 100 can compensate for multipath fading variations at sufficiently low speeds. For instance, the coherence time of the channel for 3 km/h at different carrier frequencies can be as follows: a carrier frequency of 900 MHz can have a coherence time of 400 ms, a carrier frequency of 2 GHz can have a coherence time of 180 ms, and a carrier frequency of 3 GHz can have a coherence time of 120 ms. Thus, depending on latency and periodicity of adjustments, fast fading effects can be corrected with low Doppler frequencies.

System 100 can employ uplink power control that combines open loop and closed loop power control mechanisms. According to an example, open loop power control can be utilized by each access terminal 116, 122 for setting power levels of a first preamble of a Random Access Channel (RACH) communication. For the first preamble of a RACH, each access terminal 116, 122 may have obtained downlink (DL) communication(s) from base station 102, and the open loop mechanism can enable each access terminal 116, 122 to select an uplink transmit power level that is inversely proportional to a receive power level related to the obtained downlink communication(s). Thus, knowledge of the downlink can be utilized by access terminals 116, 122 for uplink transmissions. The open loop mechanism can allow for very fast adaptation to severe changes of radio conditions (e.g., depending on receive power filtering) by way of instantaneous power adjustments. Further, the open loop mechanism can continue to operate beyond the RACH processing in contrast to conventional techniques oftentimes employed. The closed loop mechanism can be utilized by system 100 once the random access procedure has succeeded. For example, closed loop techniques can be employed when periodic uplink resources have been allocated to access terminals 116, 122 (e.g., the periodic uplink resources can be Physical Uplink Control Channel (PUCCH) or Sounding Reference Signal (SRS) resources). Moreover, the corresponding sectors in base station 102 (and/or a network) can control uplink transmit power utilized by access terminals 116, 122 based upon the closed loop control.

The closed loop mechanism employed by system 100 can be periodic, aperiodic or a combination of the two. Periodic closed-loop corrections can be transmitted by the corresponding sectors in base station 102 to access terminals 116, 122 periodically (e.g., once every 0.5 ms, 1 ms, 2 ms, 4 ms, . . . ). For instance, the periodicity can be dependent upon periodicity of uplink transmissions. Moreover, the periodic corrections can be single-bit corrections (e.g., up/down, ±1 dB, . . . ) and/or multi-bit corrections (e.g., ±1 dB, ±2 dB, ±3 dB, ±4 dB, . . . ). Thus, the power control step and the periodicity of corrections can determine a maximum rate of change of uplink power that the corresponding sectors in base station 102 (and/or the network) can control. According to another example, aperiodic corrections can be sent from the corresponding sectors in base station 102 to corresponding access terminals 116, 122 as needed. Following this example, these corrections can be transmitted aperiodically when triggered by a network measurement (e.g., receive (RX) power outside a set margin, opportunity to send control information to a given access terminal, . . . ). Moreover, aperiodic corrections can be single-bit and/or multi-bit (e.g., the corrections can be multi-bit since a significant portion of overhead associated with aperiodic corrections can relate to correction scheduling rather than correction size). According to yet another example, the aperiodic corrections can be transmitted by the corresponding sector in base station 102 to access terminals 116, 122 in addition to periodic corrections in order to minimize the overhead incurred with the transmission of these power adjustments.

Figure 2:
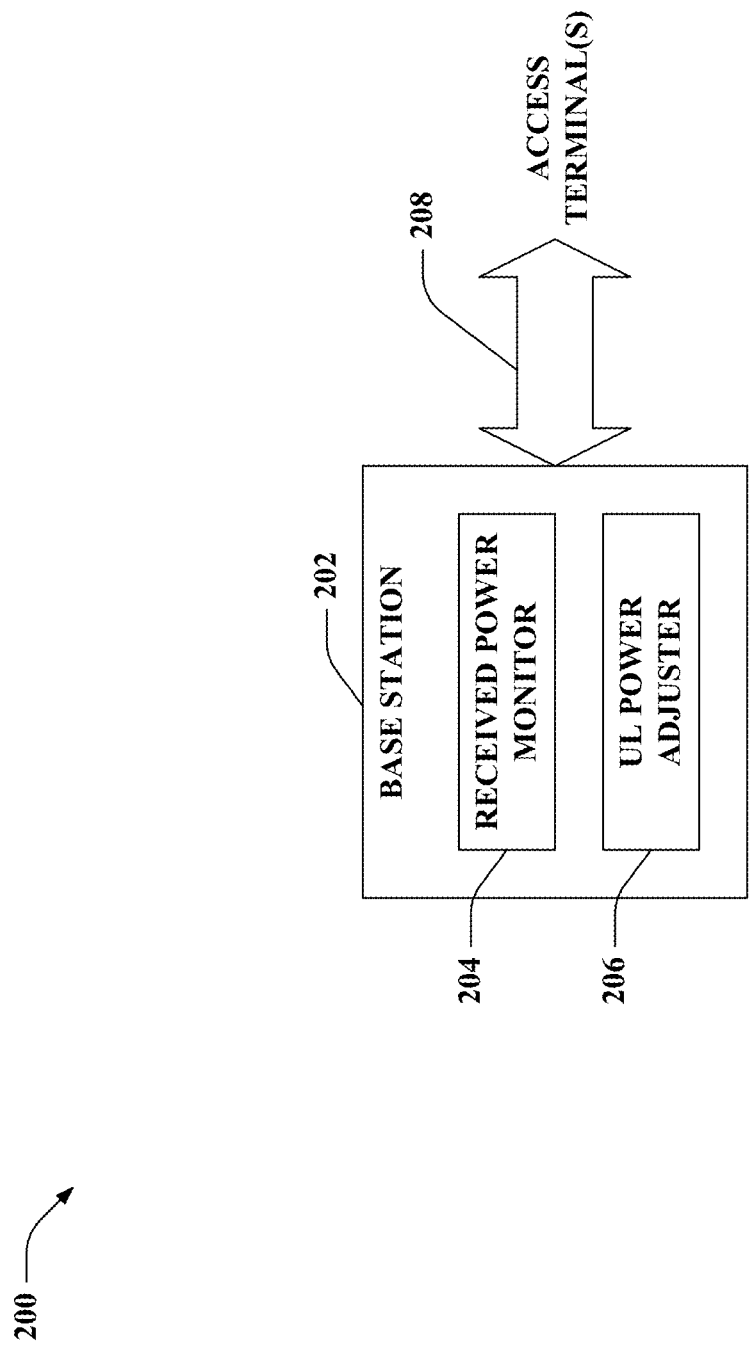
FIG. 2 is an illustration of an example system that controls uplink power level(s) employed by access terminal(s) in an LTE based wireless communication environment.

Now turning to FIG. 2, illustrated is a system 200 that controls uplink power level(s) employed by access terminal(s) in an LTE based wireless communication environment. System 200 includes a sector in a base station 202 that can communicate with substantially any number of access terminal(s) (not shown). Moreover, the sector in base station 202 can include a received power monitor 204 that evaluates power level(s) associated with uplink signal(s) obtained from access terminal(s). Further, the sector in base station 202 can comprise an uplink (UL) power adjuster 206 that utilizes the analyzed power level(s) to generate command(s) to alter access terminal power levels.

Various physical (PHY) channels 208 can be leveraged for communication between base station 202 and the access terminal(s); these physical channels 208 can include downlink physical channels and uplink physical channels. Examples of downlink physical channels include Physical Downlink Control Channel (PDCCH), Physical Downlink Shared Channel (PDSCH), and Common Power Control Channel (CPCCH). PDCCH is a DL layer 1/layer 2 (L1/L2) control channel (e.g., assigning PHY layer resources for DL or UL transmission) that has a capacity of around 30-60 bits and is cyclic redundancy check (CRC) protected. PDCCH can carry uplink grants and downlink assignments. PDSCH is a DL shared data channel; PDSCH can be a DL data channel shared amongst different users. CPCCH is transmitted on the DL for UL power controlling multiple access terminals. Corrections sent on the CPCCH can be single-bit or multi-bit. Further, the CPCCH can be a particular instantiation of the PDCCH. Examples of uplink physical channels include Physical Uplink Control Channel (PUCCH), Physical Uplink Shared Channel (PUSCH), Sounding Reference Signal (SRS), and Random Access Channel (RACH). PUCCH includes the Channel Quality Indicator (CQI) channel, the ACK channel and the UL requests. PUSCH is an UL shared data channel.

The SRS can lack information and can enable sounding the channel on the UL to allow for the channel to be sampled over part of the full system bandwidth. It is to be appreciated that the claimed subject matter is not limited to these example physical channels 208.

Received power monitor 204 and UL power adjuster 206 can provide closed loop power control for uplink transmissions effectuated by access terminal(s). Operation on the LTE system can entail transmissions at a given time over bandwidths that can be significantly less than the entirety of the bandwidth of system 200. Each access terminal can transmit over a small portion of the entire bandwidth of system 200 at a given time. Moreover, frequency hopping can be employed by the access terminals; thus, the corresponding sector in base station 202 can encounter difficulty when attempting to evaluate adjustments to make to uplink power levels of the access terminals. Therefore, an adequate closed loop power control mechanism provided by received power monitor 204 and UL power adjuster 206 constructs a wideband receive power estimate from transmissions over possibly multiple instants and on possibly multiple UL PHY channels enabling adequate correction of the path loss and shadowing effects irrespective of access terminal transmission bandwidth at any time.

Received power monitor 204 constructs the wideband receive power estimate from the sampling of the channel based upon access terminal transmissions in a variety of manners. For instance, received power monitor 204 can employ the PUSCH for sampling. Following this example, the transmission band of the PUSCH is localized on a given slot. Frequency diverse scheduling can apply a pseudo-random hopping pattern to the transmission band at slot boundaries and possibly over re-transmissions to fully exploit the frequency diversity. PUSCH transmissions exploiting frequency selective scheduling will not apply a frequency hopping pattern onto the transmit data and therefore may require a long time in order to sample the channel at all (or most) frequencies. Moreover, frequency selective scheduling can leverage transmission of an SRS or PUCCH. Frequency selective scheduling is a scheduling strategy exploiting the selectivity of the channel; for instance, frequency selective scheduling attempts to confine transmissions onto the best sub-bands. This scheduling strategy can be relevant for low mobility access terminals. Further, these transmissions are usually exclusive of frequency hopping techniques. Frequency diverse scheduling is a disparate scheduling strategy employing the entire system bandwidth (e.g., modulo the minimum transmit bandwidth capability, . . . ) to naturally obtain frequency diversity. Transmissions associated with frequency diverse scheduling can be associated with frequency hopping. Moreover, frequency hopping can include changing the transmit frequency of a waveform in a pseudo-random manner to exploit frequency diversity from the point of view of a channel as well as interference.

According to another example, received power monitor 204 can utilize the PUCCH for sampling the UL channel and therefore to construct the wideband receive power estimate. The transmission band of the PUCCH can also be localized on a given slot with hopping at the slot boundary on each transmission time interval (TTI). An occupied band can depend on whether there is PUSCH transmission on a particular TTI. When PUSCH is transmitted over a given TTI, the control information that would be transmitted over PUCCH can be transmitted in-band with the remainder of the data transmission (e.g., to retain the single-carrier property of the UL waveform) over PUSCH. When PUSCH is not transmitted over a particular TTI, the PUCCH can be transmitted over a localized band set aside for transmission of the PUCCH at the edges of the system band.

Pursuant to another illustration, SRS transmissions can be utilized by received power monitor 204 to sample the channel and construct the wideband receive power estimate. The transmission band (over time) of the SRS can be substantially equal to the entire system band (or the minimum access terminal transmit bandwidth capability). At a given SC-FDMA symbol (e.g., SC-FDMA symbol is a minimum unit of transmission on the UL of LTE), the transmission can be localized (e.g., spanning a set of consecutive subcarriers that hops over time) or distributed (e.g., spanning the entire system band or a portion thereof, which may or may not hop, . . . ).

Received power monitor 204 constructs the wideband receive power estimate from sampling of the channel over the entire system bandwidth. However, depending upon the manner by which the channel is sampled and/or whether frequency hopping is applied to the transmissions, the time span to construct the wideband receive power estimate from the sampling of the UL channel by received power monitor 204 can vary.

PUCCH transmissions when there is no UL data take place at the edges of the system band. PUCCH transmission where there is UL data can be located in-band with the data transmission over the PUSCH. Further, PUSCH transmissions may not change transmit frequency or may not be hopping at all to exploit UL frequency selective scheduling; however, to enable frequency selective scheduling, SRS transmissions can be leveraged for FDD/TDD systems. Moreover, when the PUSCH uses frequency diverse scheduling, frequency hopping is applied to transmissions.

Moreover, based upon the channel sampling effectuated by received power monitor 204, UL power adjuster 206 can generate a command that can alter the UL power level employed by a particular access terminal. The command can be a single-bit correction (e.g., up/down, ±1 dB, . . . ) and/or a multi-bit correction (e.g., ±1 dB, ±2 dB, ±3 dB, ±4 dB, . . . ). Further, UL power adjuster 206 (and/or the sector in the corresponding base station 202) can transmit the generated command to the access terminal to which the command is intended.

Further, the access terminal(s) can each be associated with a particular state at a given time. Examples of access terminal states include LTE_DLE, LTE_ACTIVE and LTE_ACTIVE_CPC. However, it is to be appreciated that the claimed subject matter is not limited to these illustrative states.

LTE_IDLE is an access terminal state where the access terminal does not have a unique cell ID. While in the LTE_DLE state, the access terminal can lack a connection to base station 202. Further, transitioning to LTE_ACTIVE state from LTE_IDLE can be effectuated via utilization of RACH.

LTE_ACTIVE is an access terminal state where the access terminal has a unique cell ID. Further, when in LTE_ACTIVE state, the access terminal can actively transfer data via the uplink and/or downlink. Access terminals in this state have UL dedicated resources (e.g., CQI, SRS that are transmitted periodically, . . . ). According to an example, access terminals in the LTE_ACTIVE state can employ discontinuous transmission/discontinuous reception (DTX/DRX) procedures with a cycle that is not expected to be much longer than approximately 20 ms or 40 ms. Access terminals in this state start PUSCH transmissions either directly in response to DL activity (e.g., with possibly an UL grant in-band with DL data or through the PDCCH) or by sending an UL request over the PUCCH. Further, users in this state can be access terminals with an active exchange of UL/DL data taking place or access terminals running a high Grade of Service (GoS) application (e.g., Voice over Internet Protocol (VoIP), . . . ).

LTE_ACTIVE_CPC (Continuous Packet Connectivity) is a substate of LTE_ACTIVE where access terminals retain their unique cell ID but where the UL dedicated resources have been released. Utilization of LTE_ACTIVE_CPC enables extending battery life. Access terminals in this substate start transmissions either in response to DL activity (e.g., with possibly an UL grant in-band with DL data or through the PDCCH, . . . ) or by sending an UL request over the RACH. The initial transmit power can be either based on an open loop mechanism (e.g., response to DL activity) or a last successful preamble (e.g., RACH).

Figure 3:
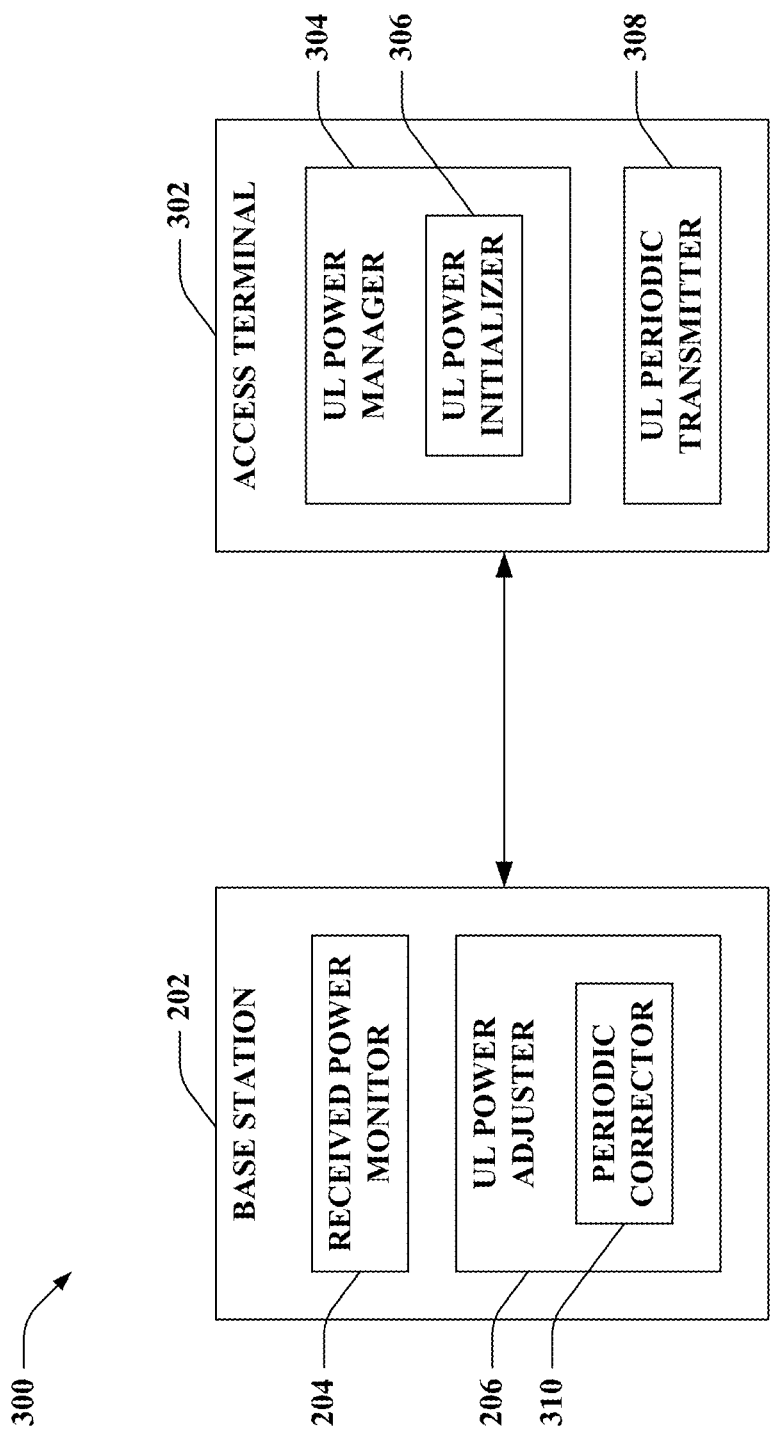
FIG. 3 is an illustration of an example system that periodically corrects an uplink power level employed by an access terminal.

Referring to FIG. 3, illustrated is a system 300 that periodically corrects an uplink power level employed by an access terminal. System 300 includes base station 202 that communicates with an access terminal 302 (and/or any number of disparate access terminals (not shown)). Access terminal 302 comprises an UL power manager 304, which further includes an UL power initializer 306. Moreover, access terminal 302 includes an UL periodic transmitter 308. Base station 202 further includes received power monitor 204 and UL power adjuster 206; UL power adjuster 206 further comprises a periodic corrector 310.

Periodic corrector 310 generates periodic power control commands (e.g., periodic transmission power control (TPC) commands, periodic corrections, . . . ) to be transferred to access terminal 302. Further, periodic corrector 310 can transmit the periodic power control commands to access terminal 302 (and/or any disparate access terminal(s)) with any periodicity (e.g., 0.5 ms, 1 ms, 2, ms, 4 ms, . . . ); however, it is contemplated that UL power adjuster 206 and/or base station 202 can transmit such periodic power control commands. Further, periodic corrector 310 can yield a single-bit correction (e.g., up/down, ±1 dB, . . . ) and/or a multi-bit correction (e.g., ±1 dB, ±2 dB, ±3 dB, ±4 dB, . . . ). For example, if the periodic corrections are sent from periodic corrector 310 at a higher frequency, then single-bit corrections can be more likely to be employed, and vice versa.

UL power manager 304 controls the uplink power level employed by access terminal 302 for uplink transmissions. UL power manager 304 can receive the periodic power control commands from base station 202 and alter the uplink power level utilized for transmission based upon the obtained commands. According to another illustration, UL power initializer 306 can set an initial uplink transmit power. UL power initializer 306 can employ an open loop mechanism to determine the initial uplink transmit power based upon downlink activity, for example. Additionally or alternatively, UL power initializer 306 can assign the initial uplink power level to a power level associated with a previous (e.g., immediately prior, etc.) successful preamble (e.g., RACH).

UL periodic transmitter 308 can send periodic transmissions over the uplink to base station 202. For instance, UL periodic transmitter 308 can operate while access terminal 302 is in LTE_ACTIVE state. Moreover, the periodic transmissions transferred by UL periodic transmitter 308 can be a set of SRS transmissions; however, it is to be appreciated that the claimed subject matter is not so limited as any type of periodic uplink transmission can be employed (e.g., periodic CQI transmissions, periodic PUCCH transmissions, etc.). Thus, UL periodic transmitter 308 can send SRS transmissions over the uplink to sound the channel over the entire system bandwidth since the SRS transmissions can be sounding signals; therefore, at the same time as enabling uplink frequency selective scheduling, the sounding signal can be used to compute the closed loop corrections for UL power control. Transmissions sent by UL periodic transmitter 308 can be received and/or employed by received power monitor 204 of base station 202 in connection with sampling the channel. Moreover, UL power adjuster 206 and/or periodic corrector 310 can generate commands corresponding to such sampling.

According to an illustration, periodicity of UL transmissions sent by UL periodic transmitter 308 of access terminal 302 can be linked to DL TPC command transmission cycle employed by periodic corrector 310 for access terminal 302; hence, access terminals with differing UL transmission periodicity can be sent DL TPC commands with disparate transmission cycles. Further, the periodicity of UL transmissions can correlate to a number of bits allocated for access terminal power adjustments yielded by periodic corrector 310 employed for a particular access terminal (e.g., access terminal 302, . . . ). For example, a mapping between the number of bits allocated for uplink power control correction and an uplink periodic transmission rate (e.g., SRS transmission rate, PUCCH transmission rate, . . . ) can be predetermined. Following this example, an uplink periodic transmission rate of 200 Hz can map to 1 bit, a rate of 100 Hz can map to 1 bit, a rate of 50 Hz can map to 2 bits, a rate of 25 Hz can map to 2 bits, and a rate of 0 Hz can map to x>2 bits. According to the aforementioned example, the number of bits allocated for the power adjustments at the access terminal becomes larger as the uplink periodic transmission rate decreases. At the limit for an uplink periodic transmission rate of 0 Hz (e.g., no transmission of the SRS, PUCCH, . . . ), the power adjustment can be x>2 bits, which can be the case of open loop transmissions with closed loop adjustments on an as needed basis.

Periodic corrector 310 can send corrections on a periodic basis to substantially all users in LTE_ACTIVE state associated with base station 202. Pursuant to an example, users to which periodic corrector 310 sends commands can be grouped based upon, for example, GoS requirements, DRX/DTX cycle and offset, and so forth. The transmission of the power control commands for the group of users can be made by periodic corrector 310 on a particular instantiation of the PDCCH that can be denoted CPCCH or TPC-PDCCH. According to another illustration, periodic corrector 310 can utilize in-band signaling to a group of users, where the size of the group can be greater than or equal to 1. Overhead associated with periodic correction can be based on a number of bits that the correction requires and the associated control (if any) required to convey the information to the relevant access terminals.

For transfer of transmission power control (TPC) commands over the PDCCH by periodic corrector 310, a 32 bit payload and an 8 bit CRC can be employed. For instance, 32 single-bit TPC commands in a 1 ms interval can be used for one PDCCH instant. Thus, 320 users in LTE_ACTIVE state can be supported at 100 Hz using a single PDCCH on each TTI assuming FDD is employed. Accordingly, single bit corrections can be provided every 10 ms, which can allow for 100 dB/s corrections. According to another example, 16 dual-bit TPC commands can be employed in a 1 ms interval. Thus, 320 users can be supported in LTE_ACTIVE state with 50 Hz using a single PDCCH on each TTI assuming FDD is employed. Hence, dual bit corrections every 20 ms allow for 100 dB/s corrections.

Figure 4:
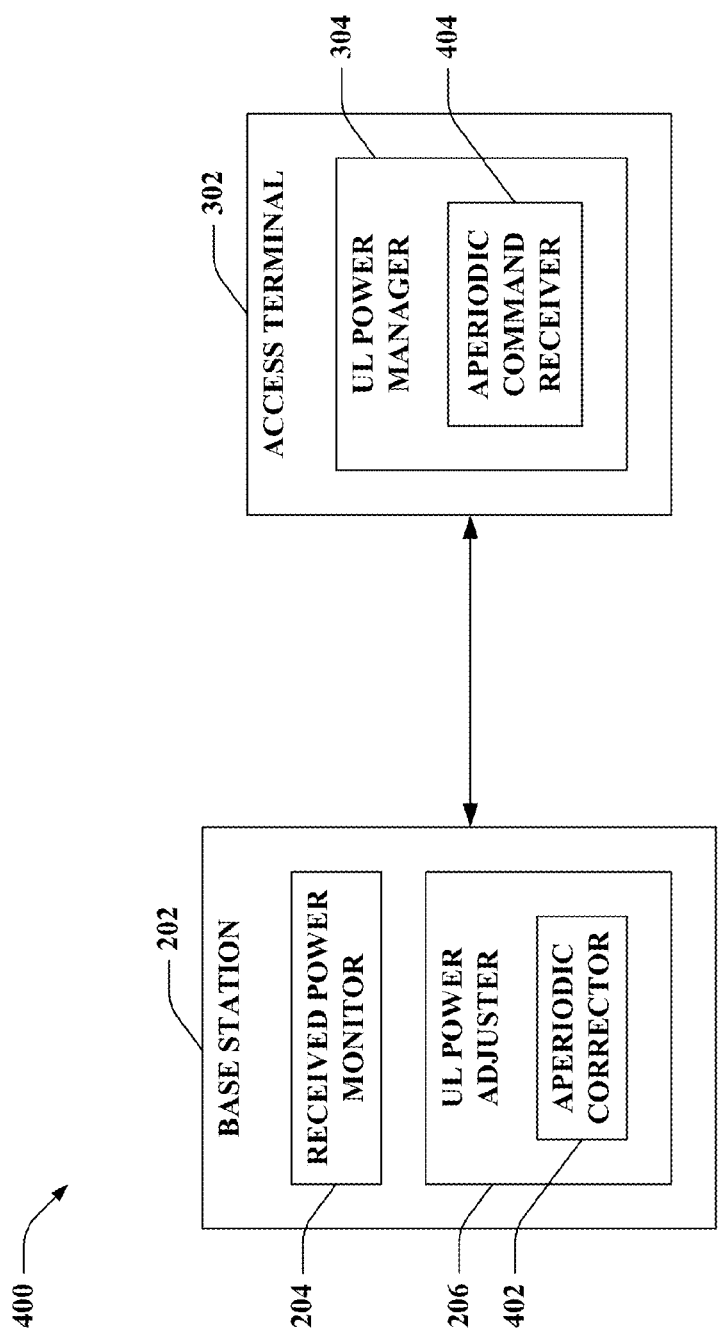
FIG. 4 is an illustration of an example system that aperiodically transfers power control commands to access terminals in an LTE based wireless communication environment.

Now turning to FIG. 4, illustrated is a system 400 that aperiodically transfers power control commands to access terminals in an LTE based wireless communication environment. System 400 includes base station 202 that communicates with access terminal 302 (and/or any number of differing access terminal(s) (not shown)). Base station 202 includes received power monitor 204 and UL power adjuster 206, which further comprises an aperiodic corrector 402. Moreover, access terminal 302 includes UL power manager 304, which further includes an aperiodic command receiver 404.

Aperiodic corrector 402 can generate a power control command directed towards access terminal 302 on an as needed basis. For instance, aperiodic corrector 402 can transmit aperiodically when triggered by a measurement (e.g., measurement of a condition recognized utilizing data from received power monitor 204 such as received power being outside of a set margin, . . . ). Aperiodic corrector 402 can determine that an uplink power level of access terminal 302 deviates from a target at a particular time; thus, aperiodic corrector 402 can send a command to adjust this power level in response. Further, aperiodic corrector 402 can yield a single-bit correction (e.g., up/down, ±1 dB, . . . ) and/or a multi-bit correction (e.g., ±1 dB, ±2 dB, ±3 dB, ±4 dB, . . . ).

Aperiodic command receiver 404 can obtain the corrections sent by aperiodic corrector 402 (and/or UL power adjuster 206 and/or corresponding sector in base station 202 in general). For instance, aperiodic command receiver 404 can decipher that a particular correction sent by the corresponding sector in base station 202 is intended for access terminal 302. Moreover, based upon the obtained corrections, aperiodic command receiver 404 and/or UL power manager 304 can alter an uplink power level employed by access terminal 302.

Aperiodic corrections of uplink power levels employed by access terminal 302 and yielded by aperiodic corrector 402 can be trigger based. Thus, the aperiodic corrections can be associated with larger overhead as compared to periodic corrections due to the unicast nature of the aperiodic corrections. Additionally, according to an example where multi-bit aperiodic corrections are employed, these corrections can be mapped to a particular instantiation of the PDCCH (e.g., in which case the power correction can be transmitted as part of the DL assignment or UL grant) or a PDCCH/PDSCH pair (e.g., in which case the power correction can be transmitted stand-alone or in-band with other data transmission).

Figure 5:
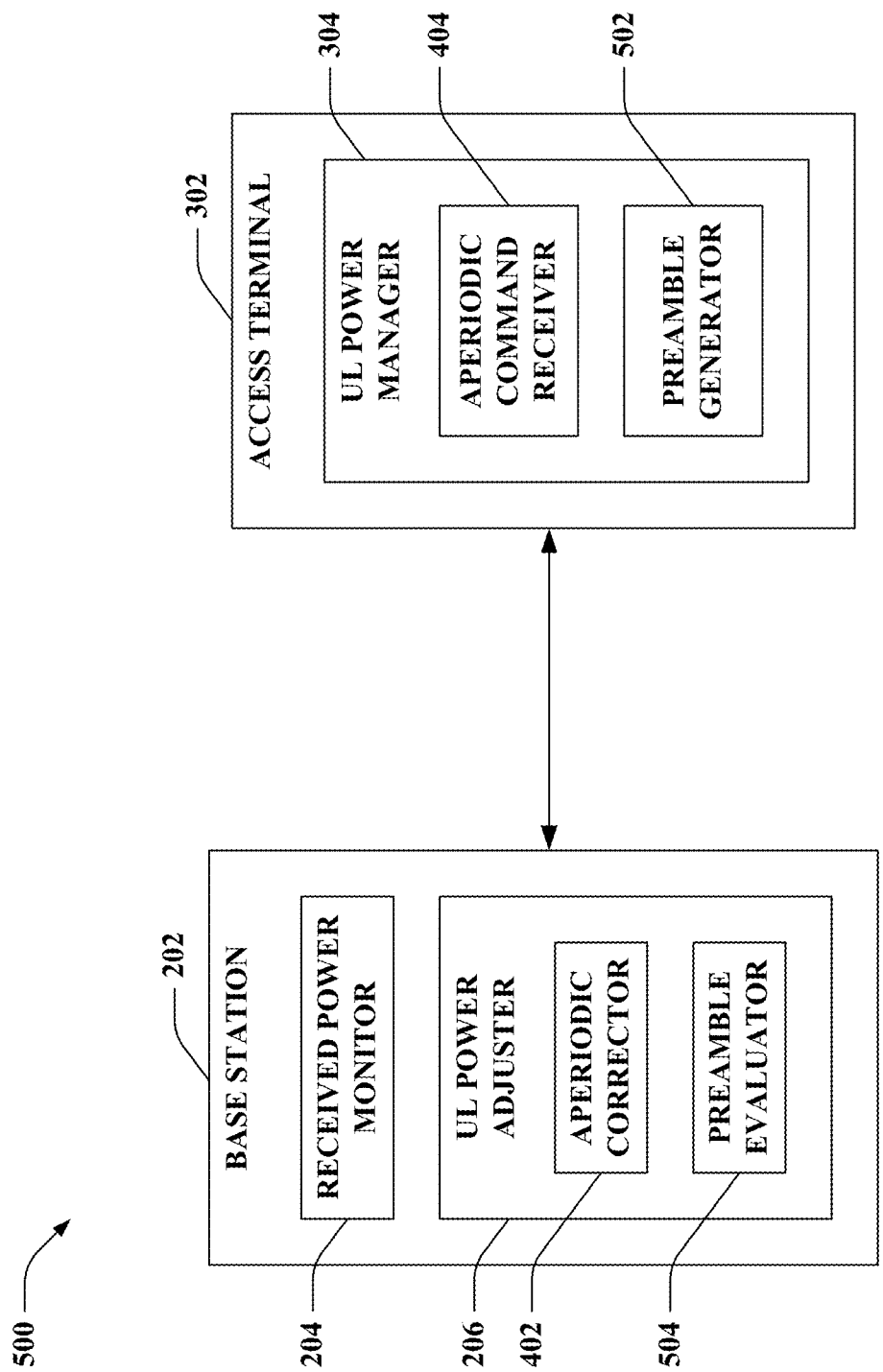
FIG. 5 is an illustration of an example system that employs preamble based uplink power control in an LTE based wireless communication environment.

Referring to FIG. 5, illustrated is a system 500 that employs preamble based uplink power control in an LTE based wireless communication environment. System 500 includes a sector in base station 202 that communicates with access terminal 302 (and/or any number of disparate access terminal(s) (not shown)). As described above, the corresponding sector in base station 202 can include received power monitor 204 and UL power adjuster 206, which can further comprise aperiodic corrector 402, and access terminal 302 can include UL power manager 304, which can further comprise aperiodic command receiver 404. Although not shown, it is contemplated that UL power adjuster 206 can include periodic corrector 310 of FIG. 3 in addition to or instead of aperiodic corrector 402 and/or access terminal 302 can include a periodic command receiver in addition to or instead of aperiodic command receiver 404; thus, it is contemplated that the claimed subject matter is not limited to the following illustration employing aperiodic corrector 402 and aperiodic command receiver 404. Moreover, UL power manager 304 can also include a preamble generator 502 that transmits a power control preamble over the uplink to the corresponding sector in base station 202 prior to uplink data transmission (e.g., before PUSCH/PUCCH transmission, . . . ). Additionally, UL power adjuster 206 can include a preamble evaluator 504 that analyzes the received power control preamble to correct power settings employed by access terminal 302 and send a power control command over the downlink to access terminal 302. However, it is contemplated that preamble generator 502 can be included in access terminal 302 yet separate from UL power manager 304 and/or preamble evaluator 504 can be included in the corresponding sector in base station 202 but separate from UL power adjuster 206.

Uplink power control can yield significant variance in SNR with bursty transmissions. To mitigate such variance, preamble transmission can enable power control commands to be provided to access terminal 302 prior to uplink data transmission, where uplink data transmission can start or resume immediately following an UL grant transmitted over the PDCCH. Upon receiving the UL grant, UL power manager 304 can employ open loop power control for setting an initial power level for sending an uplink transmission. By utilizing preamble generator 502, a transient effect associated with the open loop power control can be mitigated when sensitive information is to be sent on the uplink over the PUCCH or PUSCH.

Preamble generator 502 can transmit a power control preamble over the uplink. The power control preamble can be a single-time SRS transmission. Such transmission of the power control preamble can be scheduled by the corresponding sector in base station 202 (and/or a network) explicitly or implicitly. The power control preamble sent by preamble generator 502 enables the channel to be rapidly sounded with an uplink transmission spanning part or the entire system bandwidth (e.g., modulo the minimum access terminal transmit bandwidth capacity, . . . ). According to an illustration, two or four hops per TTI can be achieved with the power control preamble. Further, the power control preamble can enable the first PUCCH or PUSCH transmission after an UL grant received after UL inactivity to be efficiently closed loop power controlled.

According to an example, when access terminal 302 obtains an UL grant while in LTE_ACTIVE_CPC (e.g., because of downlink data activity), the power of an initial transmission to be sent over the uplink as determined by UL power manager 304 can be based on open loop power control (e.g., without employing closed loop mechanisms). The initial open loop setting can be noisy, and thus, can be less than optimal for the transmit power. However, once the transmit power from the first uplink transmission of access terminal 302 can be corrected, the reliability of the uplink transmissions can considerably improve.

To address the forgoing example, preamble generator 502 sends a power control preamble that precedes transmission of information from access terminal 302 to the corresponding sector in base station 202 (e.g., the information can be transmitted on PUSCH and/or PUCCH). The power control preamble can be communicated at a power level yielded according to open loop power control mechanisms. Preamble evaluator 504 can obtain and review the power control preamble to quickly correct power settings of access terminal 302 as evinced by the power control preamble. For instance, preamble evaluator 504 can generate and transmit a power control command (e.g., transmission power control (TPC) command) to adjust the power level utilized by UL power manager 304 of access terminal 302. The power control command can be a single-bit correction and/or a multi-bit correction. Thereafter, UL power manager 304 can implement the power control command obtained from the corresponding sector in base station 202. Further, access terminal 302 can thereafter send uplink transmissions (e.g., PUSCH and/or PUCCH transmissions) at the corrected open loop power level as set by UL power manager 304 in response to receiving the power control command.

Transmission of the power control preamble from preamble generator 502 can be scheduled explicitly or implicitly by the corresponding sector in base station 202 (and/or a scheduler (not shown) of base station 202). According to an illustration, explicit scheduling provides preamble generator 502 with an explicit indication to send the power control preamble over the uplink. Following this illustration, an UL grant (e.g., first UL grant) sent from base station 202 (e.g., over the PDCCH) can provide scheduling related data for transmitting the power control preamble over the uplink. Hence, the UL grant can cause preamble generator 502 to sound the channel in an efficient manner (e.g., two or four hops spanning the system bandwidth in a given TTI with the power control preamble sent over the uplink). After reception of the uplink transmission by the corresponding sector in base station 202 and analysis by preamble evaluator 504, a power correction is computed and sent on the PDCCH along with a new UL grant (e.g., second UL grant) for the PUCCH/PUSCH transmission (e.g., which is power corrected).

By way of another example, implicit scheduling of the power control preamble can be utilized. Based upon access terminal 302 being in the LTE_ACTIVE_CPC substate, preamble generator 502 can recognize a priori that a power control preamble is to be sent prior to regular transmission of data (e.g., over the PUSCH/PUCCH). Accordingly, the corresponding sector in base station 202 need not send two UL grants (e.g., as is the case for explicit scheduling of the power control preamble). Rather, an explicitly signaled UL grant can be applicable for a next hybrid automatic repeat-request (HARQ) cycle and the modulation and coding scheme (MCS) and/or resources for the power control preamble can be default and known by both access terminal 302 and the corresponding sector in base station 202 (e.g., retained in memory of access terminal 302 and/or the corresponding sector in base station 202). Thus, when employing implicit scheduling, preamble generator 502 can transfer the power control preamble on predetermined resources instead of with resources explicitly scheduled (e.g., as is the case for explicit scheduling).

After the power control preamble is utilized to correct the UL power setting, access terminal 302 can be re-allocated physical uplink resources (e.g., by base station 202) and hence brought back to the LTE_ACTIVE state. While in LTE_ACTIVE, subsequent transmissions can be based on corrections generated and sent by aperiodic corrector 402 to access terminal 302 and implemented by aperiodic command receiver 404 (and/or UL power manager 304) as described herein.

Figure 6:
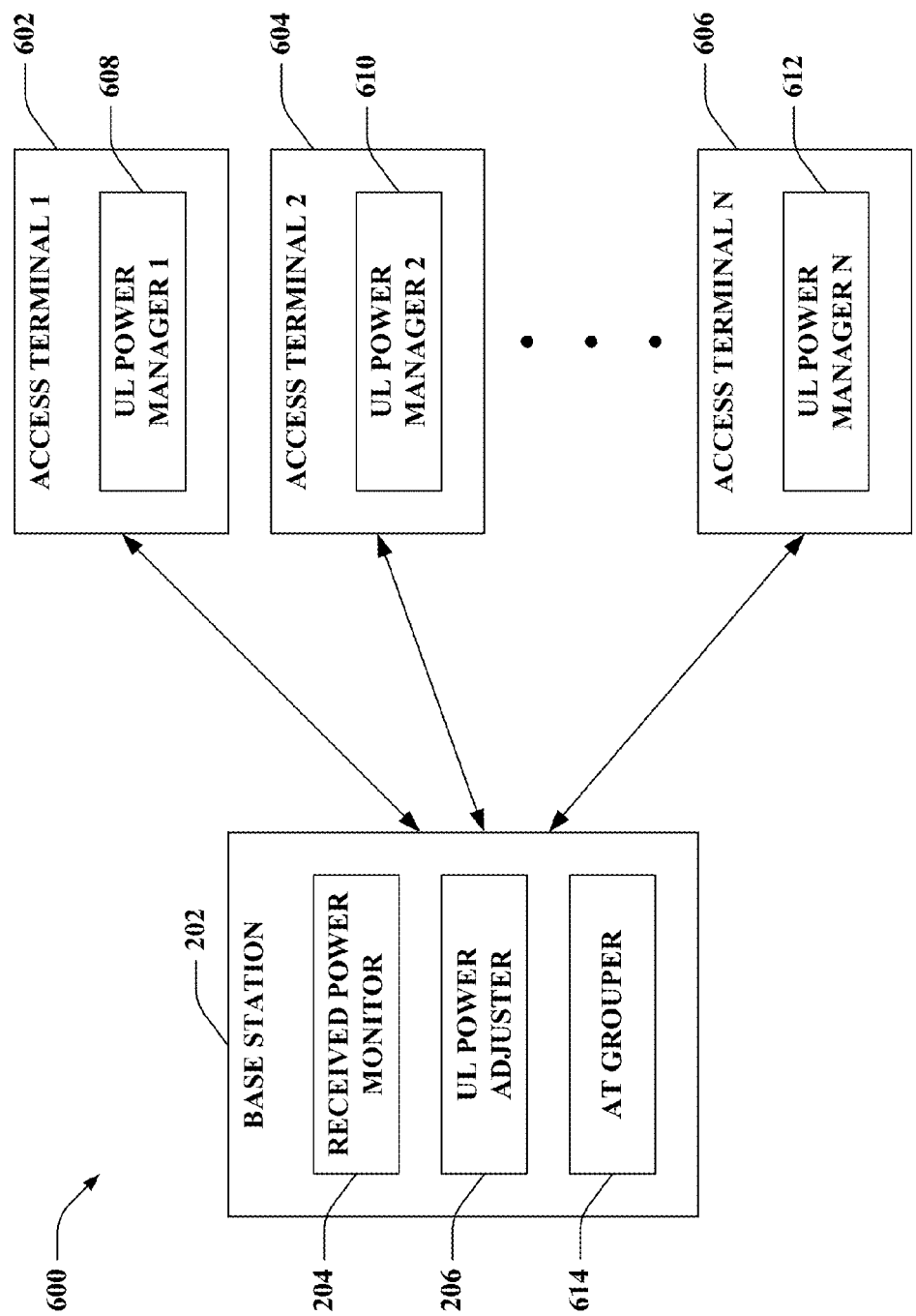
FIG. 6 is an illustration of an example system that groups access terminals for sending power control commands over a downlink.

Now referring to FIG. 6, illustrated is a system 600 that groups access terminals for sending power control commands over a downlink. System 600 includes the corresponding sector in base station 202 that communicates with an access terminal 1 602, an access terminal 2 604, . . . , and an access terminal N 606, where N can be any integer. Each access terminal 602-606 can further include a respective UL power manager (e.g., access terminal 1 602 includes a UL power manager 1 608, access terminal 2 604 includes a UL power manager 2 610, . . . , access terminal N 606 includes a UL power manager N 612). Moreover, the corresponding sector in base station 202 can comprise received power monitor 204, UL power adjuster 206 and an access terminal (AT) grouper 614 that combines a subset of access terminals 602-606 into a group for transmitting power control commands over the downlink.

AT grouper 614 can group access terminals 602-606 as a function of various factors. For instance, AT grouper 614 can assign one or more access terminals 602-606 to a group based upon DRX cycle and phase. Pursuant to another illustration, AT grouper 614 can allocate access terminal(s) 602-606 to groups based upon uplink periodic transmission rates (e.g., SRS transmission rate, PUCCH transmission rate, . . . ) employed by access terminals 602-606. By combining subsets of access terminals 602-606 into disparate groups, transmission of power control commands by UL power adjuster 206 on the DL over the PDCCH (or CPCCH, TPC-PDCCH) can be effectuated more efficiently (e.g., by sending power control commands for multiple access terminals grouped together in a common message). By way of example, AT grouper 614 can form groups for utilization with periodic uplink power control; however, the claimed subject matter is not so limited.

According to an illustration, access terminal 1 602 can employ a transmission rate of 200 Hz for SRS transmission, access terminal 2 604 can utilize a transmission rate of 50 Hz for SRS transmission, and access terminal N 606 can use a transmission rate of 100 Hz for SRS transmission. AT grouper 614 can recognize these respective transmission rates (e.g., utilizing signals obtained via received power monitor 204, . . . ). Thereafter, AT grouper 614 can assign access terminal 1 602 and access terminal N 606 to a group A (along with any other access terminal(s) that employ 100 Hz or 200 Hz transmission rates). AT grouper 614 can also allocate access terminal 2 604 (and any disparate access terminal(s) that employ 25 Hz or 50 Hz transmission rates) to a group B. It is to be appreciated, however, that the claimed subject matter is not limited to the aforementioned illustration. Further, AT grouper 614 can assign group IDs to each of the groups (e.g., for use on the PDCCH or CPCCH). Upon assigning access terminals 602-606 to respective groups, commands sent by UL power adjuster 206 can employ downlink resources corresponding to a particular group associated with an intended recipient access terminal. For instance, AT grouper 614 and UL power adjuster 206 can operate in conjunction to send TPC commands to multiple access terminals 602-606 in each PDCCH transmission. Moreover, each UL power manager 608-612 can recognize appropriate PDCCH transmission(s) to listen to for obtaining TPC command(s) directed thereto (e.g., based upon corresponding group IDs, . . . ).

Figure 7:
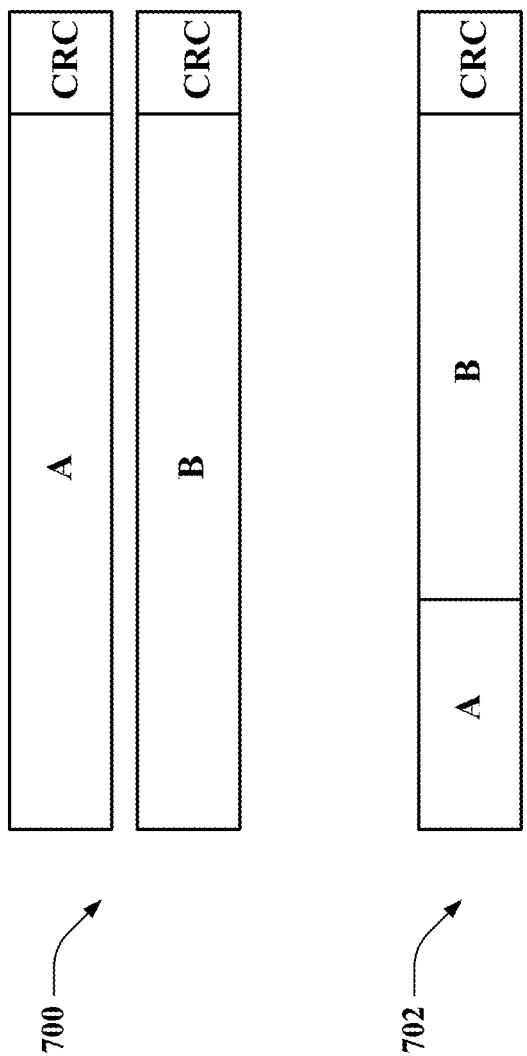
FIG. 7 is an illustration of example transmission structures for communicating power control commands to access terminal groups.

Turning to FIG. 7, illustrated are example transmission structures for communicating power control commands to access terminal groups. For example, the transmission structures can be employed for PDCCH transmissions. Two example transmission structures are depicted (e.g., transmission structure 700 and transmission structure 702); however, it is contemplated that the claimed subject matter is not limited to these examples. Transmission structures 700 and 702 can reduce overhead by grouping power control commands for multiple users into each PDCCH transmission. As illustrated, transmission structure 700 groups power control commands for users in group A upon a first PDCCH transmission and power control commands for users in group B upon a second PDCCH transmission. Further, both the first and second PDCCH transmissions include a cyclic redundancy check (CRC). Moreover, transmission structure 702 combines power control commands for users in groups A and B upon a common PDCCH transmission. By way of illustration, for transmission structure 702, power control commands for users in group A can be included in a first segment of the common PDCCH transmission and power control commands for users in group B can be included in a second segment of the common PDCCH transmission.

Figure 8:
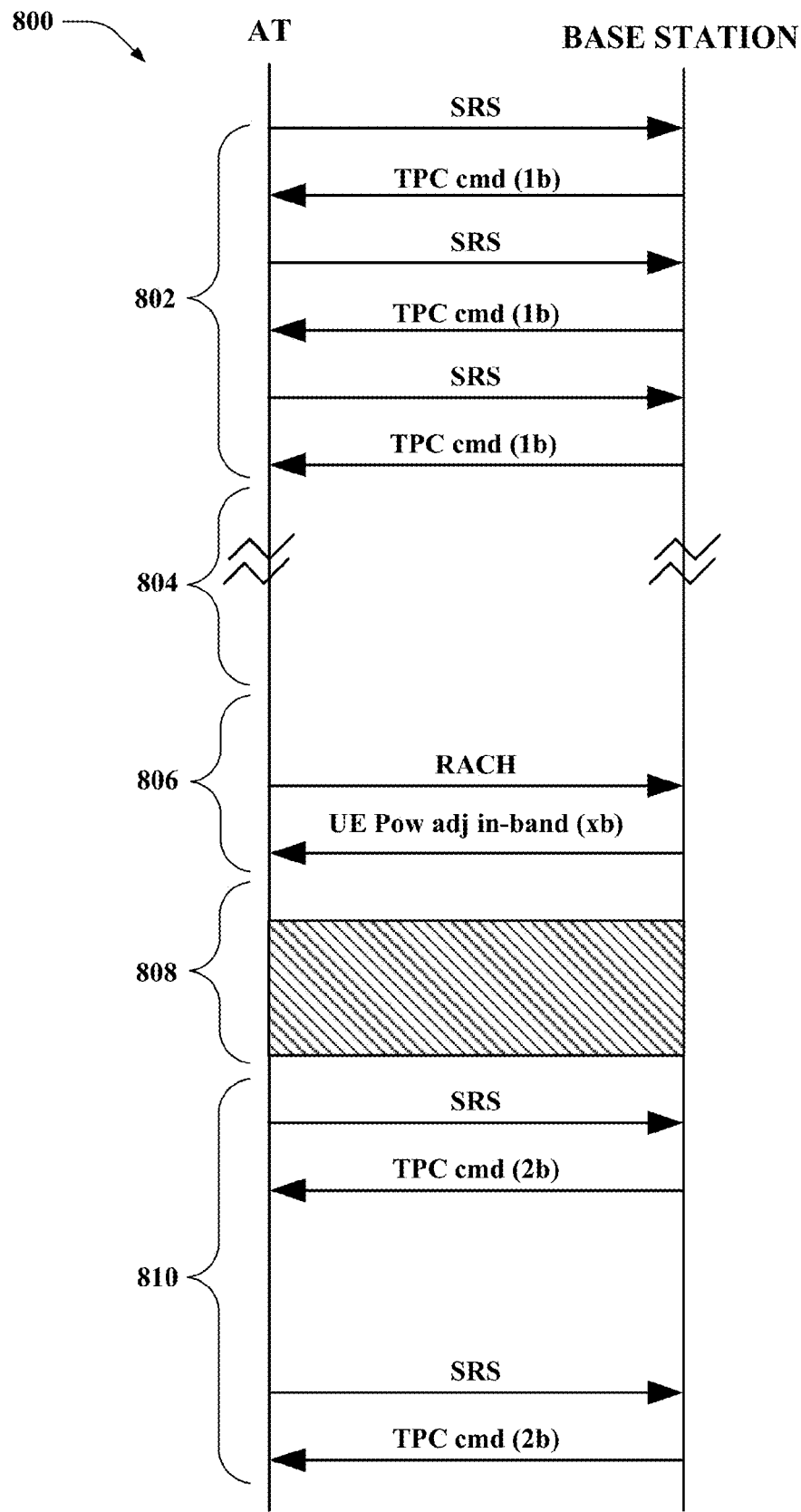
FIG. 8 is an illustration of an example timing diagram for a periodic uplink power control procedure for LTE.

Referring to FIG. 8, illustrated is an example timing diagram 800 for a periodic uplink power control procedure for LTE. At 802, power control procedures for an access terminal in LTE_ACTIVE state are illustrated. In this state, the access terminal sends periodic SRS transmissions to a base station, and the base station replies to the periodic SRS transmissions with periodic TPC commands. As shown in the illustrated example, the transmit power of the access terminal is corrected by a single TPC bit transmitted periodically on the downlink. It is to be noted that the periodic SRS transmissions can be replaced by periodic CQI transmissions, periodic PUCCH transmissions, and the like. Periodic CQI transmissions or periodic PUCCH transmissions may be less efficient from a channel sounding standpoint since these transmissions may not span the entire system band; however, such transmissions can be leveraged for closed loop corrections based on UL measurements at the base station.

At 804, an inactivity period for the access terminal is depicted. After the inactivity period (e.g., predetermined or use of a threshold period), the access terminal is transitioned to an LTE_ACTIVE_CPC substate. In this substate, the PHY UL resources are de-allocated from the access terminal; accordingly, it may not be possible to use closed loop power control when UL transmissions resume.

At 806, the access terminal resumes uplink transmissions. The RACH is employed to resume uplink transmissions using an open loop estimate. Pursuant to an example, the open loop estimate can be modified in according to a last transmission power with some forgetting factor if deemed beneficial. In response to the RACH sent by the access terminal, the base station can transmit an in-band power adjustment for the access terminal (e.g., x bit power adjustment, where x can be substantially any integer).

At 808, an identity of the access terminal can be verified through the RACH procedure. Further, PHY UL resource re-allocation can be effectuated (e.g., along with SRS configuration) at 808.

At 810, the access terminal is in LTE_ACTIVE state. Hence, the access terminal resumes periodic transmissions of the SRS. As depicted, the periodicity of the periodic SRS transmissions at 810 differ from the periodicity of the periodic SRS transmissions at 802; however, the claimed subject matter is not so limited. In response to the periodic SRS transmissions, the base station sends TPC commands that in this case account for 2 bits (e.g., ±1 dB, ±2 dB). Further, although not illustrated, access terminal transmissions can continue to utilize open loop corrections determined from the receive power level at the access terminal. Therefore, the closed loop corrections can be exclusive and/or on top of the open loop corrections determined from the changes in the receive power at the access terminal.

Figure 9:
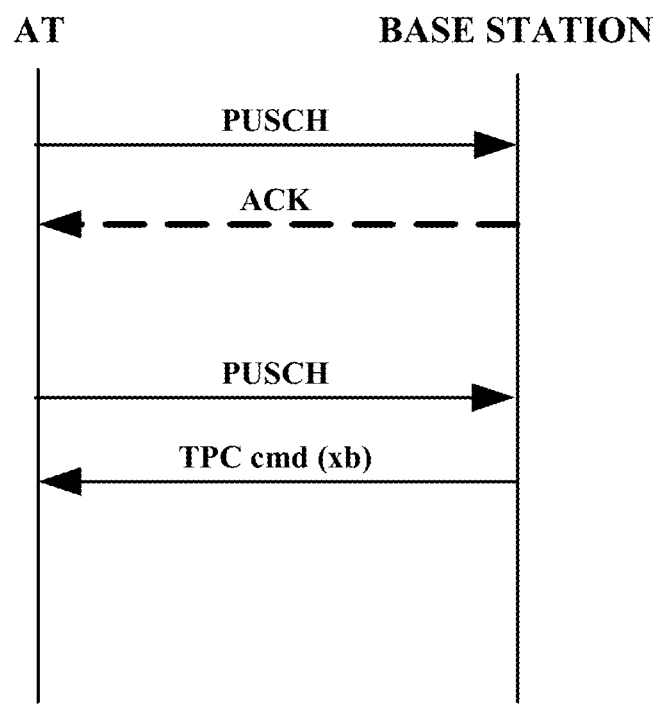
FIG. 9 is an illustration of an example timing diagram for an aperiodic uplink power control procedure for LTE.

Now turning to FIG. 9, illustrated is an example timing diagram 900 for an aperiodic uplink power control procedure for LTE. Illustrated are power control procedures for an access terminal in LTE_ACTIVE state. Timing diagram 900 can lack periodic uplink transmissions. Further, power corrections can be sent from a base station to the access terminal based on power received over the PUSCH. The base station evaluates PUSCH transmissions to determine whether to effectuate a power adjustment. Aperiodic power adjustments can be relied upon where the base station sends a message (e.g., TPC command on UL grant) to the access terminal if a power adjustment is deemed to be needed by the base station upon evaluation of a particular PUSCH transmission. When the base station determines that such power adjustment is not necessary at a particular time for a given PUSCH transmission, the base station need not transmit a TPC command at such time in response to the given PUSCH transmission (e.g., rather, an ACK can be transmitted in response to the given PUSCH transmission, . . . ). Moreover, regardless whether a TPC command is obtained by the access terminal at a given time, the access terminal can constantly rely on corrections based on an open loop mechanism. Further, the corrections sent by the base station can be single bit and/or multi-bit corrections.

It is to be appreciated that a similar scheme can be employed with periodic UL transmissions where corrections can be sent on the DL on an as needed basis. Thus, the access terminal can periodically send SRS transmissions on the uplink, which can be evaluated by the base station to determine power adjustments to be effectuated. Thereafter, upon determining that a power adjustment is needed at a particular time, the base station can send a TPC command over the downlink to the access terminal (e.g., aperiodic downlink transmission of power control commands).

The uplink power control procedures depicted in FIGS. 8 and 9 include common aspects. Namely, the notion of $\Delta$PSD (Delta Power Spectral Density) used for the UL data transmissions can be employed for both periodic and aperiodic uplink power control. The $\Delta$PSD can provide a maximum transmit power that is allowed for a given user in order to minimize an impact to adjacent cells. The $\Delta$PSD can evolve over time as a function of, for example, the load indicator from adjacent cells, channel conditions, and so forth. Further, the $\Delta$PSD can be reported to the access terminal (e.g., in-band) when possible. In the LTE systems, the network can choose which MCS/Max data-to-pilot power ratio the access terminal is allowed to transmit. The initial $\Delta$PSD, however, can be based on the MCS in the UL grant (e.g., relationship between the UL grant and the initial $\Delta$PSD can be formula based). Moreover, much of the aforementioned relates to intra-cell power control. Other mechanisms for inter-cell power control (e.g., load control) can be complementary to the mechanisms described herein.

According to another illustration, periodic and aperiodic uplink power control procedures can operate in combination. Following this illustration, periodic updates can be utilized on top of aperiodic updates. If there are scheduled PUSCH transmissions, they can require corresponding PDCCH transmissions with the UL grant, and therefore, the power control commands can be transmitted in the PDCCHs with the UL grants. If the PDCCH is not available, for instance, for persistent UL transmissions (e.g., not requiring the UL grants because the PHY resources are configured by higher layers), then power control commands can be transmitted on TPC-PDCCH1. Also, if there are scheduled PDSCH on the DL, then the power controlling of PUCCH (e.g., CQI and ACK/NAK) can become more critical. In such a case, the power control commands for PUCCH can be communicated on the PDCCHs with the DL assignments. For DL transmissions without associated control or for the case of no DL data activity, the periodic transmissions on TPC-PDCCH2 can be used to power control PUCCH. Accordingly, power control commands can be transmitted when needed (e.g., aperiodically) while making use of available resources (e.g., PDCCH with UL grants for PUSCH, PDCCH with DL assignments for PUCCH, periodic TPC commands on TPC-PDCCH which can be relevant for PUCCH and persistently scheduled PUSCH, . . . ).

Figure 10:
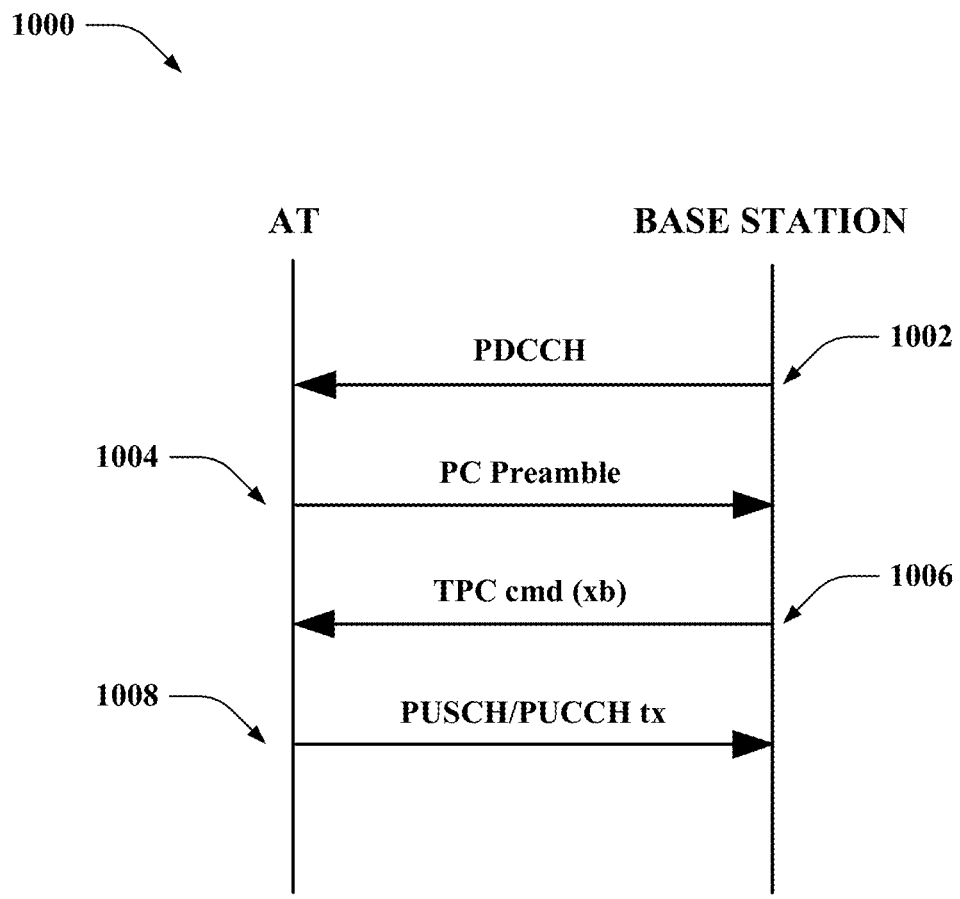
FIG. 10 is an illustration of an example timing diagram for an uplink power control procedure for LTE that leverages a power control preamble.

Now turning to FIG. 10, illustrated is an example timing diagram 1000 for an uplink power control procedure for LTE that leverages a power control preamble. Timing diagram 1000 relies on transmission of a power control preamble scheduled from a base station (or network) in an explicit or implicit way. At 1002, an UL grant can be sent from a base station (or network) to an access terminal. The UL grant can be transferred by way of PDCCH transmission. At 1004, the access terminal sends a power control (PC) preamble to the base station. The power control preamble can be sent at a power level determined based upon an open loop power control mechanism. At 1006, the corresponding sector in base station can correct the power setting of the access terminal as gleaned from the received power control preamble. The corresponding sector in base station can transmit a power control command (e.g., TPC) to the access terminal. The power control command can be a single-bit command and/or a multi-bit command. When employing explicit scheduling, the power control command can be sent by the corresponding sector in base station along with a second UL grant for the access terminal to transmit data. According to another illustration, when utilizing implicit scheduling, the power control command need not be sent with an UL grant; rather, the UL grant sent at 1002 can be utilized by the access terminal for transmitting data over the uplink. At 1008, the access terminal can transmit data over the uplink to the base station. The data can be transmitted by the access terminal with the corrected power setting (e.g., the power level determined via open loop power control and adjusted based upon the received power control command). For instance, the data can be sent as a PUSCH transmission and/or a PUCCH transmission. Thereafter, although not depicted, regular closed loop power control techniques as described herein can thereafter be implemented while the access terminal remains in LTE_ACTIVE state.

Figure 11:
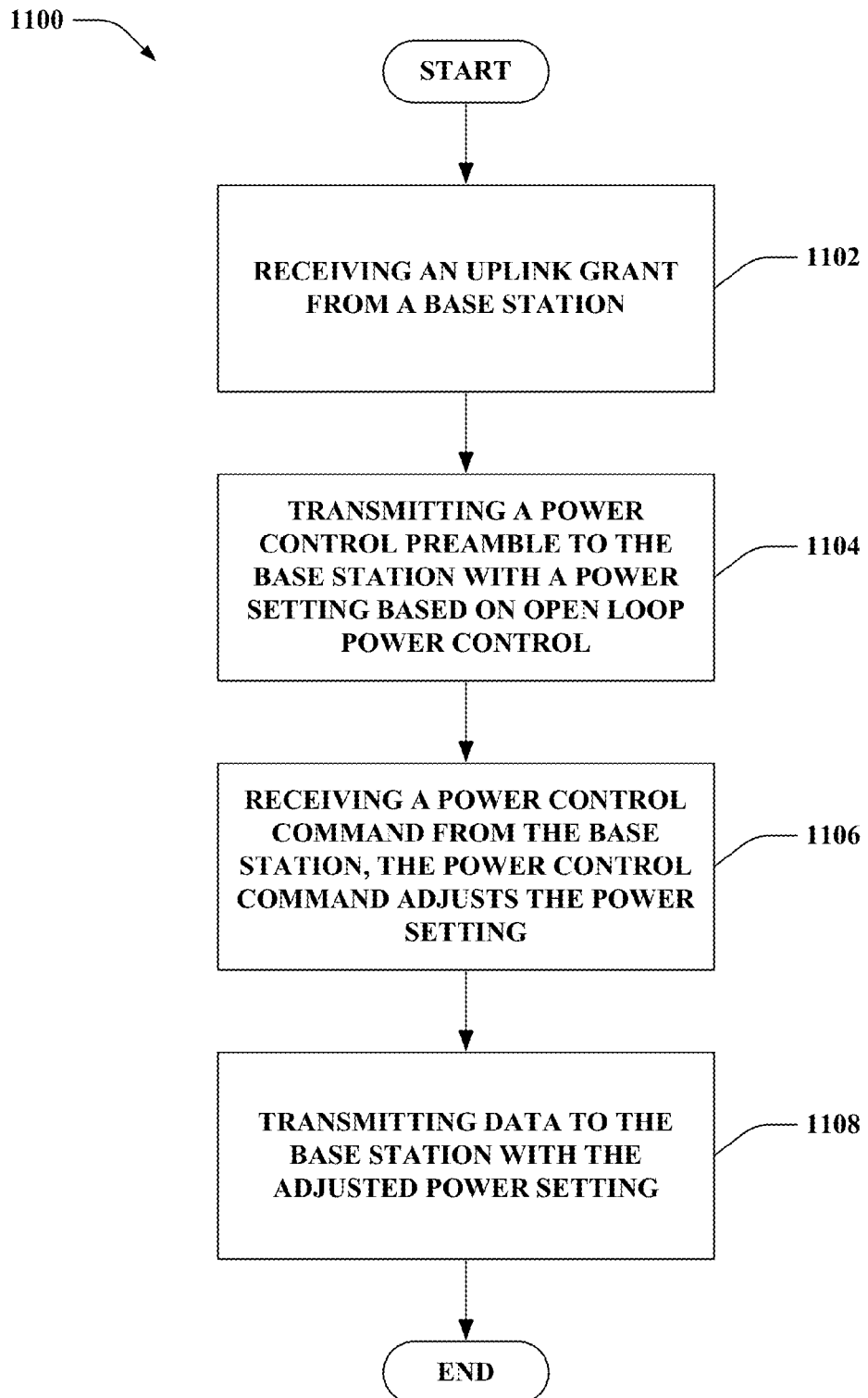
FIG. 11 is an illustration of an example methodology that facilitates generating a power control preamble for utilization with power control in a Long Term Evolution (LTE) based wireless communication environment.
Figure 12:
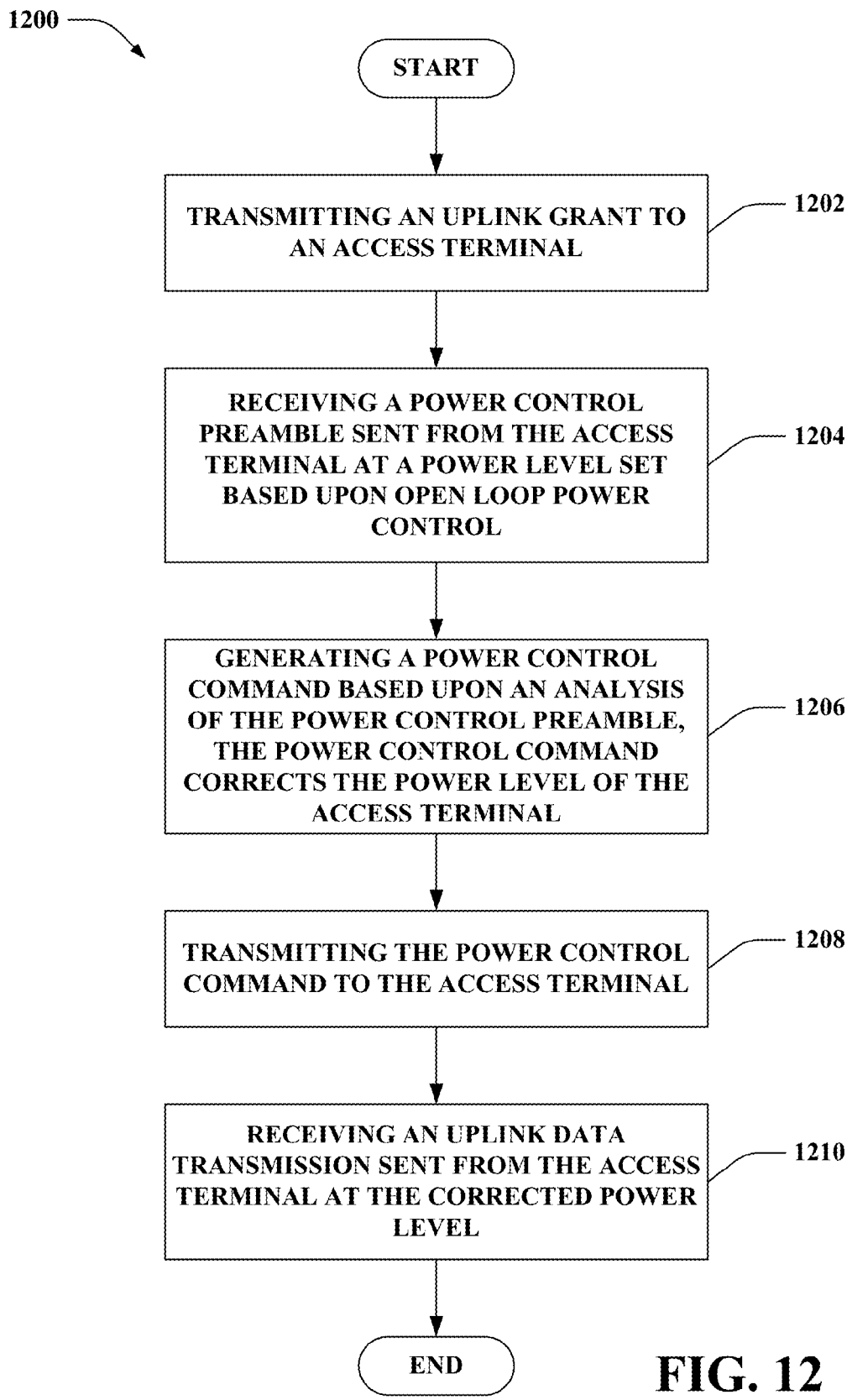
FIG. 12 is an illustration of an example methodology that facilitates evaluating power control preambles for employment with power control in a Long Term Evolution (LTE) based wireless communication environment.

Referring to FIGS. 11-12, methodologies relating to utilizing power control preambles in conjunction with controlling uplink power via periodic, aperiodic or a combination of periodic and aperiodic corrections in an LTE based wireless communication environment are illustrated. While, for purposes of simplicity of explanation, the methodologies are shown and described as a series of acts, it is to be understood and appreciated that the methodologies are not limited by the order of acts, as some acts can, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with one or more embodiments.

With reference to FIG. 11, illustrated is a methodology 1100 that facilitates generating a power control preamble for utilization with power control in a Long Term Evolution (LTE) based wireless communication environment. At 1102, an uplink grant can be received from a corresponding sector in a base station. The uplink grant can be communicated via a Physical Downlink Control Channel (PDCCH) transmission. For instance, the uplink grant can be received while an access terminal is in an LTE_ACTIVE_CPC state. According to another illustration, the uplink grant received at 1102 can be a first uplink grant obtained after uplink inactivity. At 1104, a power control preamble can be transmitted to the corresponding sector in the base station with a power setting based on open loop power control. The power control preamble can be an uplink transmission that rapidly sounds the channel over part or an entire system bandwidth (e.g., modulo the minimum access terminal transmit bandwidth capability). For instance, the power control preamble could be a single-time Sounding Reference Signal (SRS) transmission. By way of another example, the power control preamble can be an aperiodic Channel Quality Indicator (CQI) report on an uplink data channel. The power control preamble could employ two or four hops spanning the system bandwidth in a given transmission time interval (TTI). Further, the power control preamble can be an uplink transmission that precedes uplink data transmission on a Physical Uplink Shared Channel (PUSCH) and/or a Physical Uplink Control Channel (PUCCH). Moreover, the power setting utilized for transmitting the power control preamble can be based upon open loop power control since closed loop power control can be unavailable to the access terminal prior to being in an LTE_ACTIVE state. Moreover, scheduling of the power control preamble transmission can be explicit or implicit. According to an example where explicit scheduling is employed (e.g., transmission characteristics can be explicitly indicated), the uplink grant received at 1102 can allocate resources, specify modulation and/or coding to be utilized, and so forth for transmission of the power control preamble. Pursuant to another illustration where implicit scheduling is utilized (e.g., transmission characteristics can be implicitly indicated), predetermined resources, modulation, coding, etc. can be leveraged for transmission of the power control preamble; thus, the access terminal can utilize these predetermined resources, modulation, coding, etc. for sending the power control preamble over the uplink without such information explicitly being included in the uplink grant received at 1102.

At 1106, a power control command can be received from the corresponding sector in the base station. The power control command can adjust the power setting of the access terminal utilized for uplink transmission. For instance, the power control command can be a single-bit correction and/or a multi-bit correction. Thus, the access terminal can modify the power setting in accordance with the received power control command. Further, after the power control preamble is utilized to correct the power setting, physical uplink resources can be re-allocated to the access terminal and the access terminal can transition to the LTE_ACTIVE state. Moreover, if explicit scheduling is employed, a second uplink grant can be received along with the power control command, and the second uplink grant can be utilized to send a next uplink data transmission. Alternatively, if implicit scheduling is utilized, the power control command need not be accompanied by a second uplink grant; rather, the uplink grant received at 1102 can be used for sending a next uplink data transmission (e.g., the uplink grant in such case can be applicable for a next hybrid automatic repeat-request (HARQ) cycle).

At 1108, data can be transmitted to the base station with the adjusted power setting. The open loop estimate for the power setting can be modified by the correction provided as part of the power control command, and the data transmission can be effectuated at this adjusted power setting. The data transmission can be in response to the second uplink grant obtained with the power control command if explicit scheduling is employed or the uplink grant received at 1102 if implicit scheduling is utilized. The data transmission can be a Physical Uplink Shared Channel (PUSCH) transmission and/or a Physical Uplink Control Channel (PUCCH) transmission. Pursuant to a further example, the data transmission can relate to a set of periodic transmissions (e.g., SRS transmissions, CQI transmissions, PUCCH transmissions, . . . ).

Moreover, a power control command can be received subsequent to the data transmission at 1108. The power control command can be sent over the downlink upon occurrence of a triggering condition. The power control command can be a single-bit command and/or a multi-bit command. Further, the power control command can be obtained via a Physical Downlink Control Channel (PDCCH) or a PDCCH/PDSCH (Physical Downlink Shared Channel) pair. Moreover, the power control command can be received as a stand-alone transmission or in-band with other data transmitted from a corresponding sector in a base station. The power setting utilized for the data transmission at 1108 can thereafter be altered based upon the power control command. Further, at a time when a power control command is not obtained, such alterations to the power setting need not be effectuated. According to another example, whether or not the power control command is received and utilized to adjust the power setting, open loop power control mechanisms can be employed to alter the power setting. By way of further illustration, data can be transmitted upon the uplink at the power setting as altered by any type of power control command, e.g., periodic and/or aperiodic.

Now turning to FIG. 12, illustrated is a methodology 1200 that facilitates evaluating power control preambles for employment with power control in a Long Term Evolution (LTE) based wireless communication environment. At 1202, an uplink grant can be transmitted to an access terminal. The uplink grant can be sent while the access terminal is in an LTE_ACTIVE_CPC state. Moreover, the uplink grant can be sent over a PDCCH. According to an example, the uplink grant can explicitly schedule transfer of a power control preamble from the access terminal (e.g., transmission characteristics can be explicitly indicated); thus, following this example, the access terminal can assign resources, modulation, coding, and the like to be employed for transmission of the power control preamble. By way of another example, predetermined resources, modulation, coding, etc. can be utilized by the access terminal for transmission of the power control preamble (e.g., implicit scheduling, transmission characteristics can be implicitly indicated, . . . ), and the uplink grant sent at 1202 can be applicable for an uplink data transmission sent by the access terminal associated with a next hybrid automatic repeat-request (HARQ) cycle.

At 1204, a power control preamble can be received. The power control preamble can be sent from the access terminal at a power level set based upon open loop power control. Further, the power level utilized by the access terminal for transferring the power control preamble can be gleaned from the received power control preamble. The power control preamble can be an uplink transmission that rapidly sounds the channel over part or the full system bandwidth (e.g., modulo the minimum access terminal transmit bandwidth capability). For instance, the power control preamble can employ two or four hops spanning the system bandwidth in a given transmission time interval (TTI). For instance, the power control preamble could be a single-time Sounding Reference Signal (SRS) transmission. By way of another example, the power control preamble can be an aperiodic Channel Quality Indicator (CQI) report on an uplink data channel.

At 1206, a power control command can be generated based upon an analysis of the power control preamble, where the power control command can correct the power level of the access terminal. By way of illustration, the power control command can be a single-bit correction and/or a multi-bit correction to the power level employed by the access terminal. At 1208, the power control command can be transmitted to the access terminal. When explicit scheduling is employed, a second uplink grant can be transmitted along with the power control command, and the second uplink grant can be utilized by the access terminal to send a next uplink data transmission. Alternatively, when implicit scheduling is utilized, the power control command need not be accompanied by a second uplink grant; rather, the uplink grant sent at 1202 can be used by the access terminal for sending a next uplink data transmission. Further, after the power control preamble is used to correct the power level, physical uplink resources can be re-allocated to the access terminal and the access terminal can transition to the LTE_ACTIVE state. At 1210, an uplink data transmission sent from the access terminal at the corrected power level can be received. The data transmission can be a Physical Uplink Shared Channel (PUSCH) transmission and/or a Physical Uplink Control Channel (PUCCH) transmission. Pursuant to a further example, the data transmission can relate to a set of periodic transmissions (e.g., SRS transmissions, CQI transmissions, PUCCH transmissions, . . . ).

Upon receiving the uplink data transmission at 1210, a determination can be effectuated concerning whether to adjust the power level employed by the access terminal when sending the uplink data transmission. According to an example, the power level can be compared to a target, and if the difference exceeds a threshold, then adjustment can be triggered; otherwise, if the difference is less than the threshold, then adjustment need not be effectuated at that time. Further, an amount of adjustment to the power level of the access terminal can be determined. When determining that the power level should be adjusted, an aperiodic power control command can be transmitted to the access terminal to alter the power level when triggered by a measurement (e.g., measure of received power level being outside a set margin, . . . ). Thus, the aperiodic power control command can be sent on an as needed basis. The aperiodic power control command can be a single-bit correction (e.g., up/down, ±1 dB, . . . ) and/or a multi-bit correction (e.g., ±1 dB, ±2 dB, ±3 dB, ±4 dB, . . . ). Further, the aperiodic power control command can be mapped to a particular instantiation of a Physical Downlink Control Channel (PDCCH) or a PDCCH/PDSCH (Physical Downlink Shared Channel) pair. Moreover, the aperiodic power control command can be transmitted stand-alone or in-band with other data transmissions. Additionally, for example, the aperiodic power control command can be sent via a unicast transmission.

It will be appreciated that, in accordance with one or more aspects described herein, inferences can be made regarding employing power control preambles with aperiodic power control. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences pertaining to recognizing whether to utilize explicit scheduling and/or implicit scheduling of uplink power control preamble transmission. By way of further illustration, an inference can be made related to identifying resources to be employed for uplink transmission of a power control preamble. It will be appreciated that the foregoing examples are illustrative in nature and are not intended to limit the number of inferences that can be made or the manner in which such inferences are made in conjunction with the various embodiments and/or methods described herein.

Figure 13:
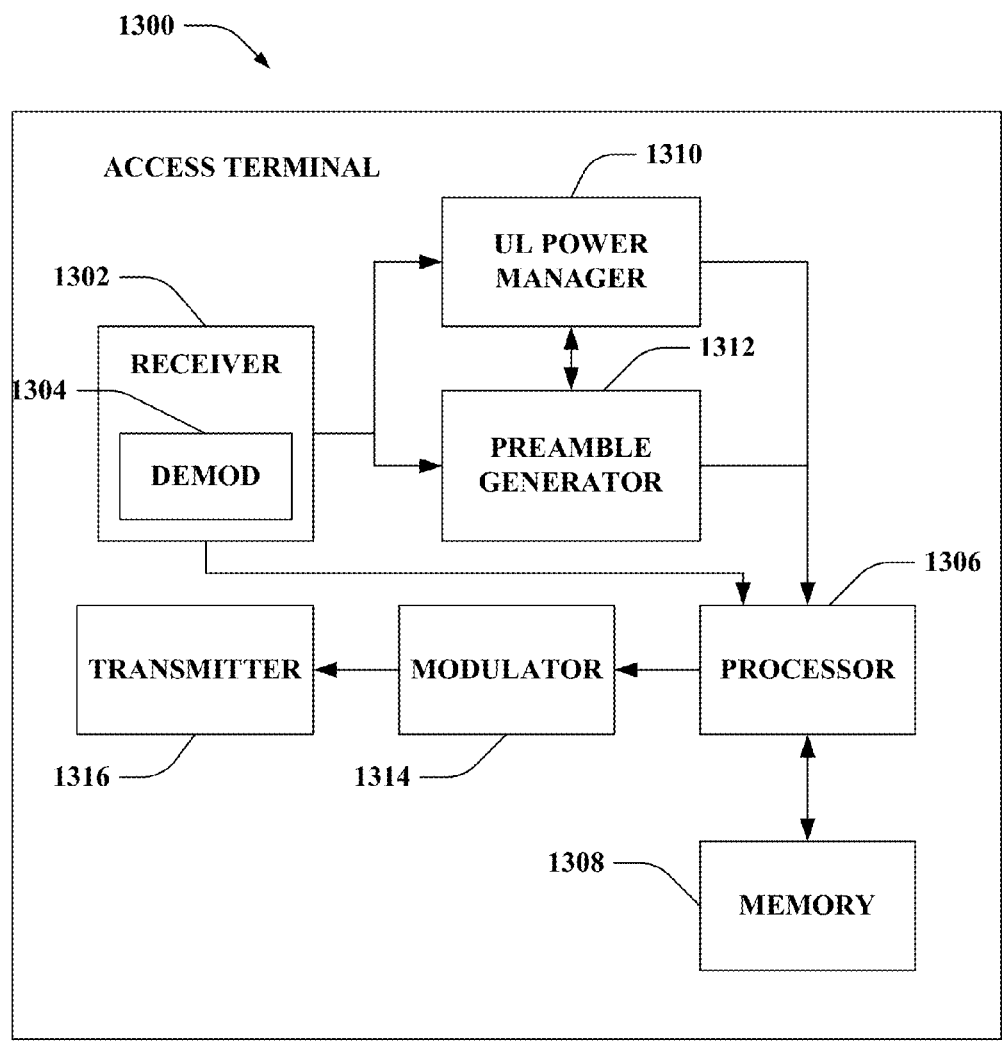
FIG. 13 is an illustration of an example access terminal that facilitates utilizing power control preambles with power control in an LTE based wireless communication system.

FIG. 13 is an illustration of an access terminal 1300 that facilitates utilizing power control preambles with power control in an LTE based wireless communication system. Access terminal 1300 comprises a receiver 1302 that receives a signal from, for instance, a receive antenna (not shown), and performs typical actions thereon (e.g., filters, amplifies, downconverts, etc.) the received signal and digitizes the conditioned signal to obtain samples. Receiver 1302 can be, for example, an MMSE receiver, and can comprise a demodulator 1304 that can demodulate received symbols and provide them to a processor 1306 for channel estimation. Processor 1306 can be a processor dedicated to analyzing information received by receiver 1302 and/or generating information for transmission by a transmitter 1316, a processor that controls one or more components of access terminal 1300, and/or a processor that both analyzes information received by receiver 1302, generates information for transmission by transmitter 1316, and controls one or more components of access terminal 1300.

Access terminal 1300 can additionally comprise memory 1308 that is operatively coupled to processor 1306 and that can store data to be transmitted, received data, identifier(s) assigned to access terminal 1300, information related to obtained power control commands, and any other suitable information for selecting whether to implement the power control commands. Memory 1308 can additionally store protocols and/or algorithms associated with generating power control preambles for sending over an uplink and/or estimating power levels for transmission based upon open loop mechanisms.

It will be appreciated that the data store (e.g., memory 1308) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1308 of the subject systems and methods is intended to comprise, without being limited to, these and any other suitable types of memory.

Receiver 1302 is further operatively coupled to an UL power manager 1310 that controls a power level utilized by access terminal 1300 for transmitting via an uplink. UL power manager 1310 can set the uplink power level for transmitting data, control signals, and so forth via any type of uplink channel. UL power manager 1310 can employ open loop mechanisms for selecting the uplink power level. Further, power control commands obtained by receiver 1302 can be utilized by UL power manager 1310 to adjust the uplink power level. Additionally, UL power manager 1310 and/or receiver 1302 can be coupled to a preamble generator 1312 that yields power control preambles for sending over the uplink at a particular power level (e.g., determined by UL power manager 1310 based upon the open loop mechanism). The power control preambles generated by preamble generator 1312 can be sent to rapidly sound the uplink channel with an uplink transmission that spans a bandwidth of a wireless communication environment. Moreover, power control commands can be received from a base station in response to the power control preambles, and the power control commands can be utilized by UL power manager 1310 to adjust the open loop estimate of the power level as utilized for the power control preambles. Access terminal 1300 still further comprises a modulator 1314 and a transmitter 1316 that transmits the signal to, for instance, a base station, another access terminal, etc. Although depicted as being separate from the processor 1306, it is to be appreciated that UL power manager 1310, preamble generator 1312 and/or modulator 1314 can be part of processor 1306 or a number of processors (not shown).

Figure 14:
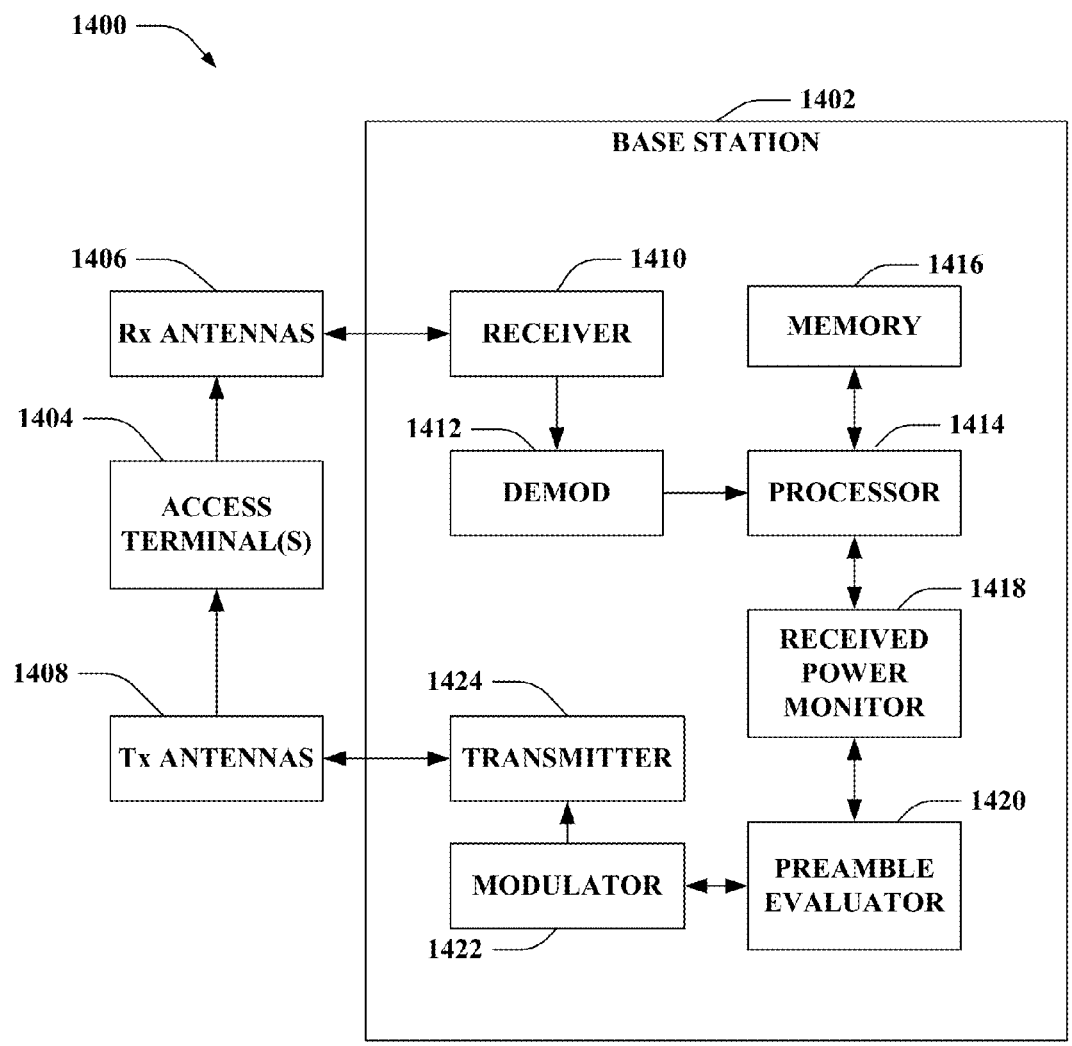
FIG. 14 is an illustration of an example system that facilitates analyzing power control preambles for use with power control in an LTE based wireless communication environment.

FIG. 14 is an illustration of a system 1400 that facilitates analyzing power control preambles for use with power control in an LTE based wireless communication environment. System 1400 comprises a sector in a base station 1402 (e.g., access point, eNB, . . . ) with a receiver 1410 that receives signal(s) from one or more access terminals 1404 through a plurality of receive antennas 1406, and a transmitter 1422 that transmits to the one or more access terminals 1404 through a transmit antenna 1408. Receiver 1410 can receive information from receive antennas 1406 and is operatively associated with a demodulator 1412 that demodulates received information. Demodulated symbols are analyzed by a processor 1414 that can be similar to the processor described above with regard to FIG. 13, and which is coupled to a memory 1416 that stores information related to access terminal identifiers (e.g., MACIDs, . . . ), data to be transmitted to or received from access terminal(s) 1404 (or a disparate base station (not shown)) (e.g., power control command(s), uplink grant(s), . . . ), and/or any other suitable information related to performing the various actions and functions set forth herein. Processor 1414 is further coupled to a received power monitor 1418 that assesses uplink power levels employed by access terminal(s) 1404 based upon signals obtained at base station 1402. For instance, received power monitor 1418 can analyze an uplink power level from a PUSCH transmission. According to another illustration, received power monitor 1418 can evaluate an uplink power level from a periodic uplink transmission.

Received power monitor 1418 can be operatively coupled to a preamble evaluator 1420 that analyzes a power control preamble obtained by base station 1402 from access terminal(s) 1404. Preamble evaluator 1420 further corrects the power level utilized by an access terminal from which the power control preamble originates. Thus, preamble evaluator 1420 generates power control commands to be sent to adjust the access terminal power level. Preamble evaluator 1420 can additionally be operatively coupled to a modulator 1422. Modulator 1422 can multiplex power control commands for transmission by a transmitter 1424 through antenna 1408 to access terminal(s) 1404. Although depicted as being separate from the processor 1414, it is to be appreciated that received power monitor 1418, preamble evaluator 1420 and/or modulator 1422 can be part of processor 1414 or a number of processors (not shown).

Figure 15:
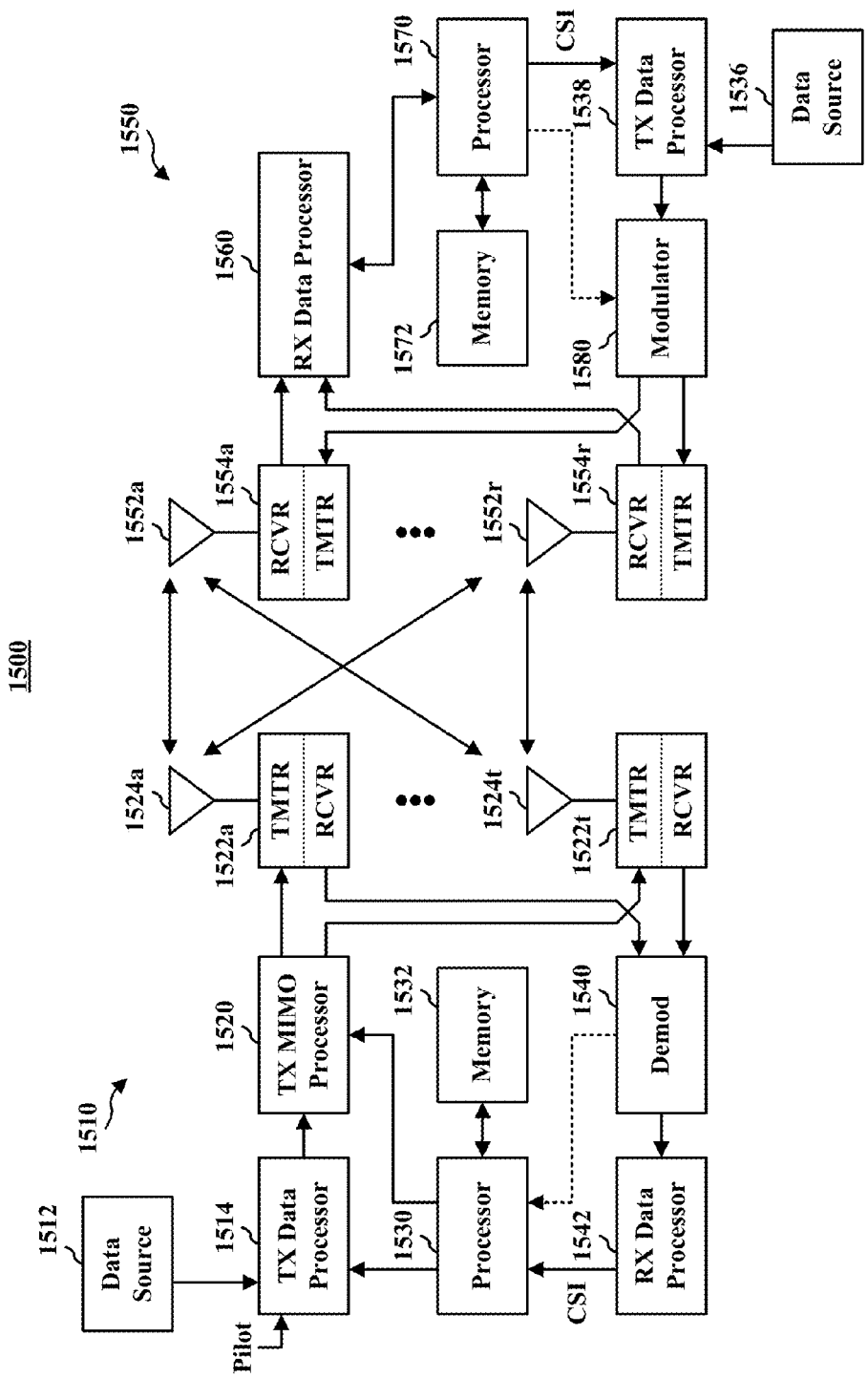
FIG. 15 is an illustration of an example wireless network environment that can be employed in conjunction with the various systems and methods described herein.

FIG. 15 shows an example wireless communication system 1500. The wireless communication system 1500 depicts a sector in one base station 1510 and one access terminal 1550 for sake of brevity. However, it is to be appreciated that system 1500 can include more than one base station and/or more than one access terminal, wherein additional base stations and/or access terminals can be substantially similar or different from example base station 1510 and access terminal 1550 described below. In addition, it is to be appreciated that base station 1510 and/or access terminal 1550 can employ the systems (FIGS. 1-6, 13-14, and 16-17) and/or methods (FIGS. 11-12) described herein to facilitate wireless communication there between.

At base station 1510, traffic data for a number of data streams is provided from a data source 1512 to a transmit (TX) data processor 1514. According to an example, each data stream can be transmitted over a respective antenna. TX data processor 1514 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at access terminal 1550 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1530.

The modulation symbols for the data streams can be provided to a TX MIMO processor 1520, which can further process the modulation symbols (e.g., for OFDM). TX MIMO processor 1520 then provides $N_T$ modulation symbol streams to $N_T$ transmitters (TMTR) 1522a through 1522t. In various embodiments, TX MIMO processor 1520 applies beamforming weights to the symbols of the data streams and to the antenna from which the symbol is being transmitted.

Each transmitter 1522 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1522a through 1522t are transmitted from $N_T$ antennas 1524a through 1524t, respectively.

At access terminal 1550, the transmitted modulated signals are received by $N_R$ antennas 1552a through 1552r and the received signal from each antenna 1552 is provided to a respective receiver (RCVR) 1554a through 1554r. Each receiver 1554 conditions (e.g., filters, amplifies, and downconverts) a respective signal, digitizes the conditioned signal to provide samples, and further processes the samples to provide a corresponding "received" symbol stream.

An RX data processor 1560 can receive and process the $N_R$ received symbol streams from $N_R$ receivers 1554 based on a particular receiver processing technique to provide $N_T$ "detected" symbol streams. RX data processor 1560 can demodulate, deinterleave, and decode each detected symbol stream to recover the traffic data for the data stream. The processing by RX data processor 1560 is complementary to that performed by TX MIMO processor 1520 and TX data processor 1514 at base station 1510.

A processor 1570 can periodically determine which available technology to utilize as discussed above. Further, processor 1570 can formulate a reverse link message comprising a matrix index portion and a rank value portion.

The reverse link message can comprise various types of information regarding the communication link and/or the received data stream. The reverse link message can be processed by a TX data processor 1538, which also receives traffic data for a number of data streams from a data source 1536, modulated by a modulator 1580, conditioned by transmitters 1554a through 1554r, and transmitted back to base station 1510.

At base station 1510, the modulated signals from access terminal 1550 are received by antennas 1524, conditioned by receivers 1522, demodulated by a demodulator 1540, and processed by a RX data processor 1542 to extract the reverse link message transmitted by access terminal 1550. Further, processor 1530 can process the extracted message to determine which precoding matrix to use for determining the beamforming weights.

Processors 1530 and 1570 can direct (e.g., control, coordinate, manage, etc.) operation at base station 1510 and access terminal 1550, respectively. Respective processors 1530 and 1570 can be associated with memory 1532 and 1572 that store program codes and data. Processors 1530 and 1570 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 16:
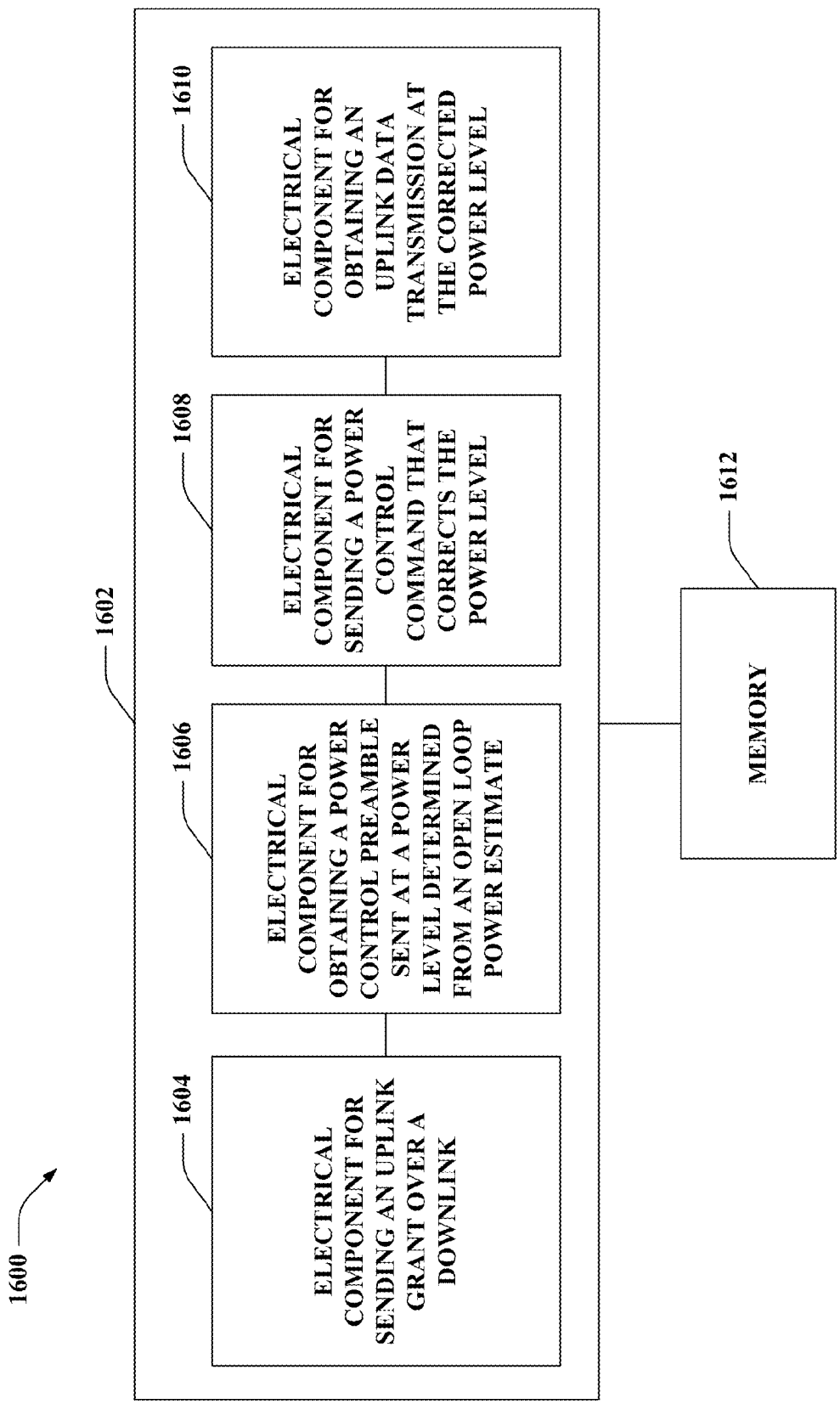
FIG. 16 is an illustration of an example system that enables yielding power control commands based upon power control preambles for utilization by access terminals in a wireless communication environment.

With reference to FIG. 16, illustrated is a system 1600 that enables yielding power control commands based upon power control preambles for utilization by access terminals in a wireless communication environment. For example, system 1600 can reside at least partially within a sector in a base station. It is to be appreciated that system 1600 is represented as including functional blocks, which can be functional blocks that represent functions implemented by a processor, software, or combination thereof (e.g., firmware). System 1600 includes a logical grouping 1602 of electrical components that can act in conjunction. For instance, logical grouping 1602 can include an electrical component for sending an uplink grant over a downlink 1604. Further, logical grouping 1602 can include an electrical component for obtaining a power control preamble sent at a power level determined from an open loop power estimate 1606. Moreover, logical grouping 1602 can comprise an electrical component for sending a power control command that corrects the power level 1608. Logical grouping 1602 can also include an electrical component for obtaining an uplink data transmission at the corrected power level 1610. Additionally, system 1600 can include a memory 1612 that retains instructions for executing functions associated with electrical components 1604, 1606, 1608, and 1610. While shown as being external to memory 1612, it is to be understood that one or more of electrical components 1604, 1606, 1608, and 1610 can exist within memory 1612.

Figure 17:
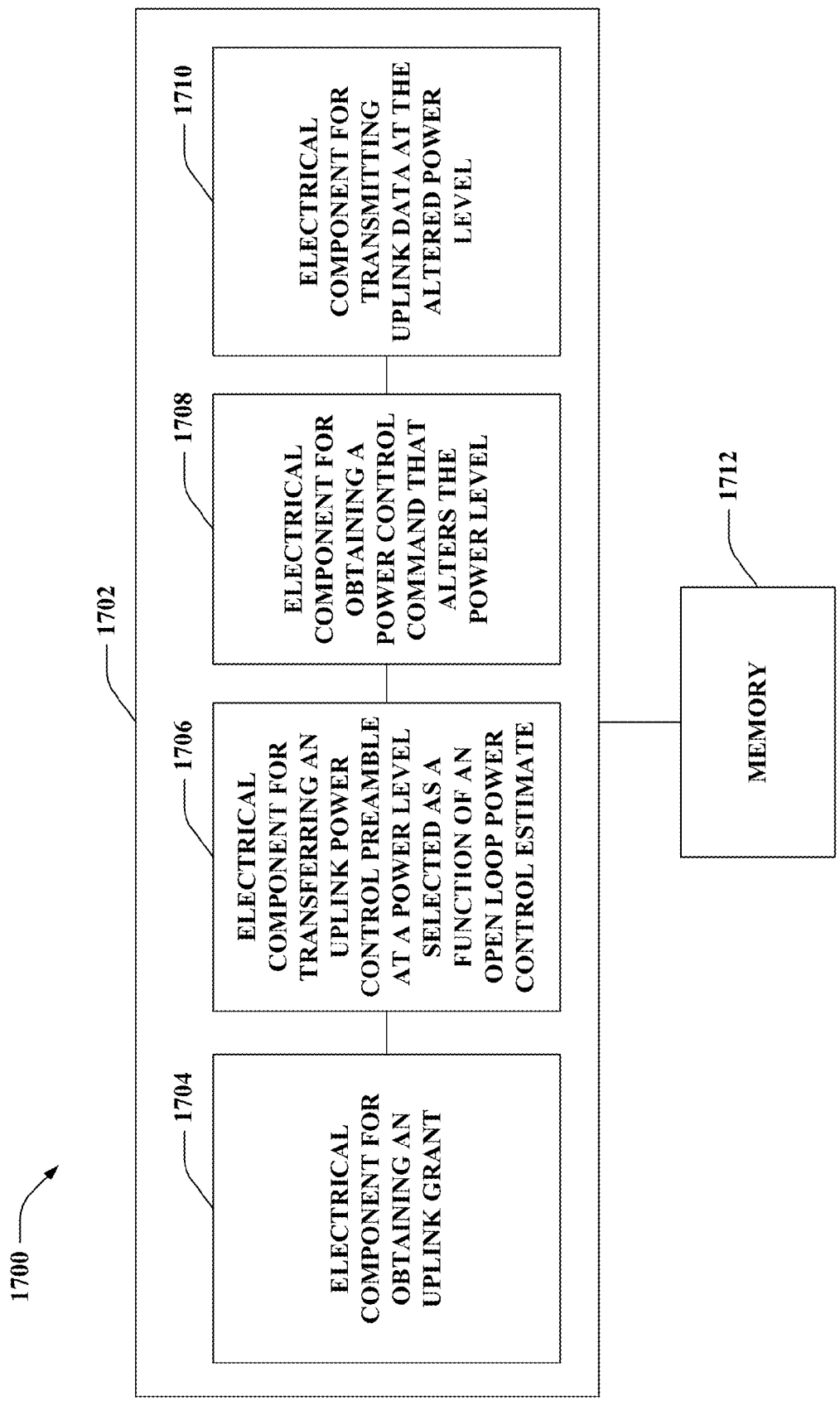
FIG. 17 is an illustration of an example system that enables utilizing power control preambles in a wireless communication environment.

Turning to FIG. 17, illustrated is a system 1700 that enables utilizing power control preambles in a wireless communication environment. System 1700 can reside within an access terminal, for instance. As depicted, system 1700 includes functional blocks that can represent functions implemented by a processor, software, or combination thereof (e.g., firmware). System 1700 includes a logical grouping 1702 of electrical components that can act in conjunction. Logical grouping 1702 can include an electrical component for obtaining an uplink grant 1704. Moreover, logical grouping 1702 can comprise an electrical component for transferring an uplink power control preamble at a power level selected as a function of an open loop power control estimate 1706. Further, logical grouping 1702 can include an electrical component for obtaining a power control command that alters the power level 1708. Also, logical grouping 1702 can include an electrical component for transmitting uplink data at the altered power level 1710. Additionally, system 1700 can include a memory 1712 that retains instructions for executing functions associated with electrical components 1704, 1706, 1708, and 1710. While shown as being external to memory 1712, it is to be understood that electrical components 1704, 1706, 1708, and 1710 can exist within memory 1712.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that facilitates generating a power control preamble for utilization in a wireless communication environment, comprising:
   receiving an uplink grant from a base station;
   transmitting a power control preamble to the base station with a power setting based on open loop power control, wherein the power control preamble is based on a single-time Sounding Reference Signal (SRS) transmission;
   receiving a power control command from the base station, the power control command adjusts the power setting; and
   transmitting data to the base station with the adjusted power setting.

2. The method of claim 1, wherein transmission characteristics of the power control preamble are explicitly indicated.

3. The method of claim 2, further comprising:
   transmitting the power control preamble in response to the uplink grant utilizing at least one of a resource, a modulation, or a coding explicitly specified in the uplink grant;
   receiving a second uplink grant from the base station along with the power control command; and
   transmitting the data to the base station by utilizing the second uplink grant received with the power control command.

4. The method of claim 1, wherein transmission characteristics of the power control preamble are implicitly indicated.

5. The method of claim 4, further comprising:
   transmitting the power control preamble in response to the uplink grant utilizing at least one of a predetermined resource, a predetermined modulation, or a predetermined coding, the at least one of the predetermined resource, the predetermined modulation or the predetermined coding being set forth to an access terminal and the base station prior to reception of the uplink grant; and
   transmitting the data to the base station by utilizing the uplink grant received prior to reception of the power control command.

6. A wireless communications apparatus, comprising:
   a memory that retains instructions related to receiving an uplink grant from a base station, transmitting a power control preamble to the base station with a power setting based on open loop power control wherein the power control preamble is based on a single-time Sounding Reference Signal (SRS) transmission, receiving a power control command from the base station, the power control command adjusts the power setting, and transmitting data to the base station with the adjusted power setting; and
   a processor, coupled to the memory, configured to execute the instructions retained in the memory.

7. The wireless communications apparatus of claim 6, wherein transmission characteristics of the power control preamble are explicitly indicated.

8. The wireless communications apparatus of claim 7, wherein the memory further retains instructions related to transmitting the power control preamble in response to the uplink grant utilizing at least one of a resource, a modulation, or a coding explicitly specified in the uplink grant, receiving a second uplink grant from the base station along with the power control command, and transmitting the data to the base station by utilizing the second uplink grant received with the power control command.

9. The wireless communications apparatus of claim 6, wherein transmission characteristics of the power control preamble are implicitly indicated.

10. The wireless communications apparatus of claim 9, wherein the memory further retains instructions related to transmitting the power control preamble in response to the uplink grant utilizing at least one of a predetermined resource, a predetermined modulation, or a predetermined coding, the at least one of the predetermined resource, the predetermined modulation or the predetermined coding being set forth to an access terminal and the base station prior to reception of the uplink grant, and transmitting the data to the base station by utilizing the uplink grant received prior to reception of the power control command.

11. A wireless communications apparatus that enables utilizing power control preambles in a wireless communication environment, comprising:
- means for receiving an uplink grant from a base station;
- means for transmitting a power control preamble to the base station with a power setting based on open loop power control, wherein the power control preamble is based on a single-time Sounding Reference Signal (SRS) transmission;
- means for receiving a power control command from the base station, the power control command adjusts the power setting; and
- means for transmitting data to the base station with the adjusted power setting.

12. The wireless communications apparatus of claim 11, wherein transmission characteristics of the power control preamble are explicitly indicated.

13. The wireless communications apparatus of claim 12, further comprising:
- means for transmitting the power control preamble in response to the uplink grant utilizing at least one of a resource, a modulation, or a coding explicitly specified in the uplink grant;
- means for receiving a second uplink grant from the base station along with the power control command; and
- means for transmitting the data to the base station by utilizing the second uplink grant received with the power control command.

14. The wireless communications apparatus of claim 11, wherein transmission characteristics of the power control preamble are implicitly indicated.

15. The wireless communications apparatus of claim 14, further comprising:
- means for transmitting the power control preamble in response to the uplink grant utilizing at least one of a predetermined resource, a predetermined modulation, or a predetermined coding, the at least one of the predetermined resource, the predetermined modulation or the predetermined coding being set forth to an access terminal and the base station prior to reception of the uplink grant, and
- means for transmitting the data to the base station by utilizing the uplink grant received prior to reception of the power control command.

16. A machine-readable medium having stored thereon machine-executable instructions for:
- receiving an uplink grant from a base station;
- transmitting a power control preamble to the base station with a power setting based on open loop power control, wherein the power control preamble is based on a single-time Sounding Reference Signal (SRS) transmission;
- receiving a power control command from the base station, the power control command adjusts the power setting; and
- transmitting data to the base station with the adjusted power setting.

17. The machine-readable medium of claim 16, wherein transmission characteristics of the power control preamble are explicitly indicated.

18. The machine-readable medium of claim 17, the machine-executable instructions further comprise:
- transmitting the power control preamble in response to the uplink grant utilizing at least one of a resource, a modulation, or a coding explicitly specified in the uplink grant;
- receiving a second uplink grant from the base station along with the power control command; and
- transmitting the data to the base station by utilizing the second uplink grant received with the power control command.

19. The machine-readable medium of claim 16, wherein transmission characteristics of the power control preamble are implicitly indicated.

20. The machine-readable medium of claim 19, the machine-executable instructions further comprise:
- transmitting the power control preamble in response to the uplink grant utilizing at least one of a predetermined resource, a predetermined modulation, or a predetermined coding, the at least one of the predetermined resource, the predetermined modulation or the predetermined coding being set forth to an access terminal and the base station prior to reception of the uplink grant, and
- transmitting the data to the base station by utilizing the uplink grant received prior to reception of the power control command.

* * * * *